United States Patent
Zhou et al.

(10) Patent No.: US 12,117,356 B2
(45) Date of Patent: Oct. 15, 2024

(54) SENSOR CALIBRATION METHOD, APPARATUS, AND DEVICE, DATA MEASUREMENT METHOD, APPARATUS, AND DEVICE, AND STORAGE MEDIUM

(71) Applicant: Tencent Technology (Shenzhen) Company Limited, Shenzhen (CN)

(72) Inventors: Cheng Zhou, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 279 days.

(21) Appl. No.: 17/708,756

(22) Filed: Mar. 30, 2022

(65) Prior Publication Data
US 2022/0221364 A1 Jul. 14, 2022

Related U.S. Application Data

(63) Continuation of application No. PCT/CN2020/126251, filed on Nov. 3, 2020.

(30) Foreign Application Priority Data

Jan. 16, 2020 (CN) .......................... 202010046558.9

(51) Int. Cl.
*G01N 25/00* (2006.01)
*G01L 1/14* (2006.01)
(Continued)

(52) U.S. Cl.
CPC .............. *G01L 25/00* (2013.01); *G01L 1/146* (2013.01); *G01L 5/226* (2013.01)

(58) Field of Classification Search
CPC ......... G01L 25/00; G01L 1/146; G01L 5/226; G01L 5/228; G01L 5/006; G01N 25/00
(Continued)

(56) References Cited

U.S. PATENT DOCUMENTS

2002/0011092 A1* 1/2002 Hara ....................... G01L 25/00
                                                                  73/1.13
2013/0073080 A1    3/2013 Ponulak

FOREIGN PATENT DOCUMENTS

CN    101528151 A    9/2009
CN    102320043 A    1/2012
(Continued)

OTHER PUBLICATIONS

Stavros Vougioukas, "Bias Estimation and Gravity Compensation for Force-Torque Sensors", Proceedings of International Conference on Mathematical Methods and Computational Techniques in Electrical Engineering, May 31, 2014 (4 pages).

(Continued)

*Primary Examiner* — Robert R Raevis
(74) *Attorney, Agent, or Firm* — Crowell & Moring LLP

(57) ABSTRACT

Embodiments of this application provide a sensor calibration method, apparatus, and device, a data measurement method, apparatus, and device, and a storage medium, where the sensor calibration method includes: acquiring a gravity of a sensor itself and a static force measured in a case that the sensor is in a static state and has no external acting force; performing equivalent calibration processing on the gravity and the static force to obtain a calibrated static force; acquiring a dynamic force measured in a case that the sensor is in a motion state and has no external acting force; performing zero drift processing on the dynamic force according to the calibrated static force to obtain a calibrated dynamic force; and using the calibrated dynamic force as a calibration parameter for performing calibration in a case that the sensor measures an external acting force, to obtain a calibrated sensor with the calibration parameter.

20 Claims, 12 Drawing Sheets

(51) Int. Cl.
*G01L 5/22* (2006.01)
*G01L 25/00* (2006.01)

(58) Field of Classification Search
USPC .............. 73/1.08, 1.13, 1.38; 702/101, 104
See application file for complete search history.

(56) References Cited

FOREIGN PATENT DOCUMENTS

| | | | |
|---|---|---|---|
| CN | 102501251 | A | 6/2012 |
| CN | 102564689 | A | 7/2012 |
| CN | 102806560 | A | 12/2012 |
| CN | 105571775 | A | 5/2016 |
| CN | 105682865 | A | 6/2016 |
| CN | 106335057 | A | 1/2017 |
| CN | 107433590 | A | 12/2017 |
| CN | 107708937 | A | 2/2018 |
| CN | 108015808 | A | 5/2018 |
| CN | 207730380 | U | 8/2018 |
| CN | 108716962 | A * | 10/2018 |
| CN | 109249397 | A | 1/2019 |
| CN | 109822574 | A | 5/2019 |
| CN | 110125936 | A | 8/2019 |
| WO | WO 2018/159114 | A1 | 9/2018 |

OTHER PUBLICATIONS

Hui Dong, "Research on the Static and Dynamic Calibration Virtual Instrument System for a Parallel Piezoelectric six-axis Force Sensor", Jan. 15, 2015 including English translation of p. 56.(92 pages).

Chinese Office Action for Chinese Application No. 2020100465589 mailed Jan. 5, 2021 including an English Concise Explanation (13 pages).

Chinese Office Action for Chinese Application No. 2020100465589 mailed Jul. 27, 2021 including an English Concise Explanation (20 pages).

International Search Report and Written Opinion for PCT/CN2020/126251 mailed Feb. 8, 2021 including translation of the International Search Report (13 pages).

* cited by examiner

SENSOR CALIBRATION METHOD, APPARATUS, AND DEVICE, DATA MEASUREMENT METHOD, APPARATUS, AND DEVICE, AND STORAGE MEDIUM

RELATED APPLICATION

This application is a continuation of International Patent Application No. PCT/CN2020/126251, filed Nov. 3, 2020, which claims priority to Chinese Patent Application No. 202010046558.9, entitled "SENSOR CALIBRATION METHOD, APPARATUS, AND DEVICE, DATA MEASUREMENT METHOD, APPARATUS, AND DEVICE, AND STORAGE MEDIUM" filed on Jan. 16, 2020. The contents of International Patent Application No. PCT/CN2020/126251 and Chinese Patent Application No. 202010046558.9 are each incorporated by reference in their entirety.

FIELD OF THE TECHNOLOGY

This application relates to the data measurement field, and relates to but is not limited to a sensor calibration method, apparatus, and device, a data measurement method, apparatus, and device, and a storage medium.

BACKGROUND OF THE DISCLOSURE

A six-dimensional force sensor is one of important components for realizing robot arm intelligence. It is widely used in space station cabin docking in the aeronautics and astronautics field, wind power generation device power and moment tests, collision detection in the automotive industry, industries such as medical and military, industrial applications such as workpiece grinding, polishing, and assembly, and the field of force feedback teleoperation.

Currently, in a case in which a six-dimensional force sensor is used, the force sensor is directly zeroed when force sensor calibration is performed.

However, in an actual use process, the force sensor is affected by a plurality of factors such as a weight of the force sensor and its load weight, so that measurement values of the force sensor are different in different postures. Therefore, in a current calibration method for a six-dimensional force sensor, an external acting force and moment cannot be accurately detected by the six-dimensional force sensor.

SUMMARY

In view of this, embodiments of this application provide a sensor calibration method, apparatus, and device, a data measurement method, apparatus, and device, and a storage medium, which can accurately calibrate the sensor, so that the sensor can accurately and directly detect external acting forces and moments in different postures.

The technical solutions of the embodiments of this application are implemented in this way:

An embodiment of this application provides a sensor calibration method, where the method is performed by an electronic device, and the method includes: acquiring a gravity of a sensor itself and a static force measured in response to the sensor being in a static state and having no external acting force; performing equivalent calibration processing on the gravity and the static force to obtain a calibrated static force; acquiring a dynamic force measured in response to the sensor being in a motion state and having no external acting force; performing zero drift processing on the dynamic force according to the calibrated static force to obtain a calibrated dynamic force; and using the calibrated dynamic force as a calibration parameter to perform calibration in response to the sensor measuring an external acting force, to obtain a calibrated sensor with the calibration parameter.

An embodiment of this application provides a data measurement method, applied to the foregoing provided sensor calibration method to perform sensor calibration to obtain a calibrated sensor; and perform data measurement by using the calibrated sensor.

An embodiment of this application provides a sensor calibration apparatus, including: a first acquiring module, configured to acquire a gravity of a sensor itself and a static force measured in response to the sensor being in a static state and having no external acting force; an equivalent calibration processing module, configured to perform equivalent calibration processing on the gravity and the static force to obtain a calibrated static force; a second acquiring module, configured to acquire a dynamic force measured in response to the sensor being in a motion state and having no external acting force; a zero drift processing module, configured to perform zero drift processing on the dynamic force according to the calibrated static force to obtain a calibrated dynamic force; and a processing module, configured to use the calibrated dynamic force as a calibration parameter to perform calibration in response to the sensor measuring an external acting force, to obtain a calibrated sensor with the calibration parameter.

An embodiment of this application provides a sensor calibration device, including: a first memory, configured to store a first executable instruction; and a first processor, configured to implement the foregoing sensor calibration method in response to executing the first executable instruction stored in the first memory.

An embodiment of this application provides a data measurement device, including: a second memory, configured to store a second executable instruction; and a second processor, configured to implement the foregoing data measurement method in response to executing the second executable instruction stored in the second memory.

An embodiment of this application provides a non-transitory storage medium that stores an executable instruction, when executed by a processor, implementing the foregoing sensor calibration method or data measurement method.

The embodiments of this application have the following beneficial effects: Because forces of a sensor in both a static state and a motion state are calibrated, calibration processing is implemented for forces of the sensor in different postures, so that the sensor can be accurately calibrated, and external acting forces and moments can be accurately and directly detected in different postures by the sensor.

DESCRIPTION OF EMBODIMENTS

Figure 1:
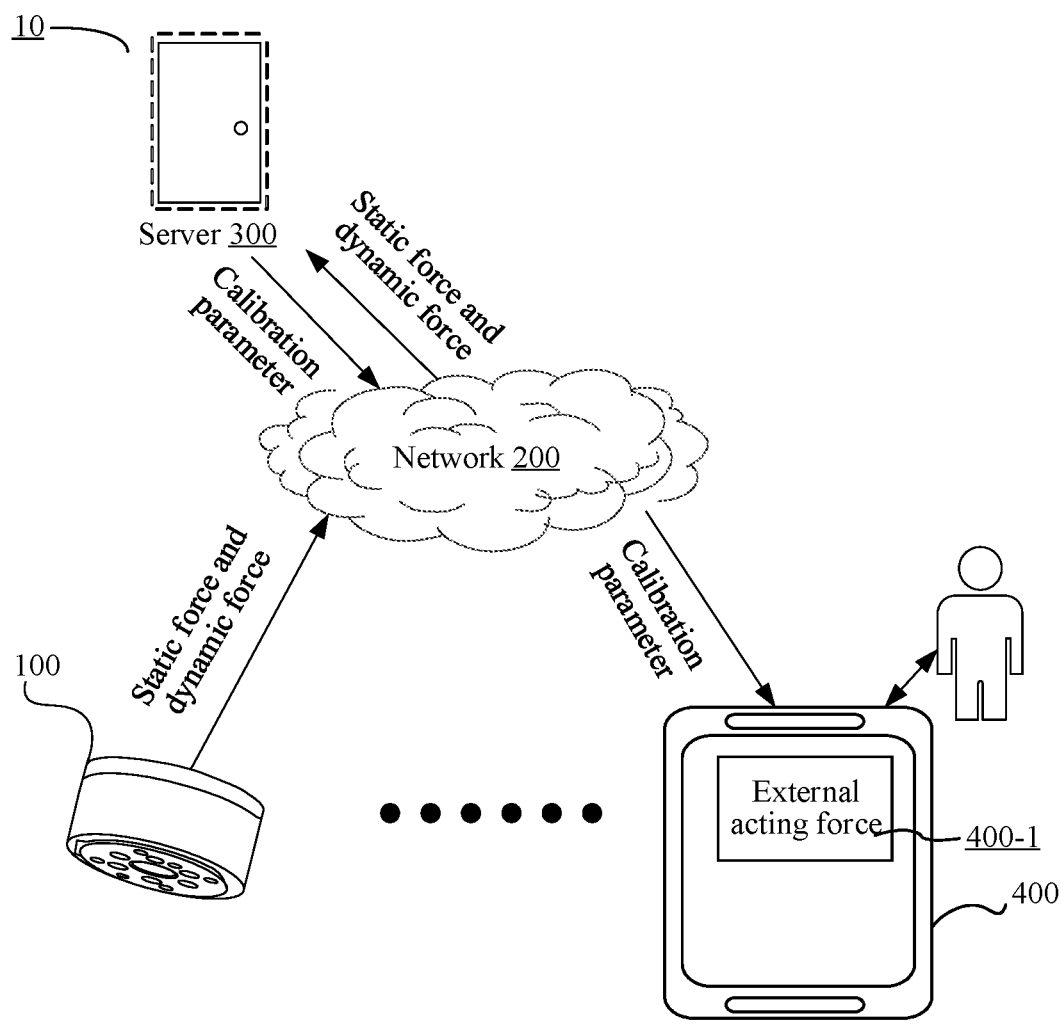
FIG. 1 is a schematic architecture diagram of a sensor calibration system according to an embodiment of this application.

To make objectives, technical solutions, and advantages of this application clearer, the following further describes this application in detail with reference to the accompanying drawings, and described embodiments are not limitations on this application. All other embodiments obtained by a person of ordinary skill in the art without creative efforts shall fall within the protection scope of this application.

The following descriptions involve "some embodiments" which describes a subset of all possible embodiments. "Some embodiments" may be a same subset of all possible embodiments or may be different subsets of all possible embodiments, and may mutually combine in a non-conflict case. Unless otherwise defined, all technical and scientific terms used herein have the same meaning as commonly understood by a person skilled in the art to which this application belongs. Terms used in the embodiments of this application are merely intended to describe objectives of the embodiments of this application, but are not intended to limit this application.

To better understand a sensor calibration method and a data measurement method provided in the embodiments of this application, a sensor calibration method in a related technology is first described. The sensor calibration method and the data measurement method in the embodiments of this application may be applied to any force sensor. For ease of understanding, in some embodiments of this application, a six-dimensional force sensor is used as an example for description.

Force sensing is an important condition for a robot to grasp and operate. In the industrial robot field, a six-dimensional force sensor is generally used for implementing force sensing of the industrial robot, and the six-dimensional force sensor is installed at an end of the robot, so as to measure end force information in a working process of the robot. The six-dimensional force sensor at the end of the robot arm is an important component for the robot arm to sense an external force. The six-dimensional force sensor is mainly installed on the end or a base of the robot arm, and is configured to detect an end contact force of the robot arm, so as to guide movement of the robot arm. Currently, the six-dimensional force sensor is widely used in industrial robots and light cooperative arms.

The six-dimensional force sensor is one of important components for realizing robot arm intelligence. It is widely used in space station cabin docking in the aeronautics and astronautics field, wind power generation device power and moment tests, and collision detection in the automotive industry. In addition, it has important application value in industries such as medical and military. In recent years, the six-dimensional force sensor has been increasingly used in industrial applications such as workpiece grinding, polishing, and assembly, and the field of force feedback teleoperation.

The six-dimensional force sensor installed at the end of the robot arm can effectively detect the force and moment acting between the robot arm and the outside, thus providing the necessary "force sensing" for compliance control and control decision of the robot arm. Impedance control based on the six-dimensional force sensor can effectively overcome a collision problem caused by an inaccurate reference position of the robot arm. According to measurement principles of six-dimensional force sensors, the six-dimensional force sensors may be classified into a strain type, a capacitive type, and a photoelectric type.

The end of the robot arm is installed with a six-dimensional force sensor, so that the end of the robot arm is connected to one end of the six-dimensional force sensor, and an end effecter is installed on the other end of the six-dimensional force sensor. On this basis, some objects are captured and operated. The force sensor needs to give a weight of the end contact force or a weight of a captured object on the basis of removing its own weight and a weight of the end effecter. In the field of target capture, the end of the robot arm carries a six-dimensional force sensor, a capture tool, and a hand-eye camera. The robot arm follows a movement of a target object under guidance of the camera, and on this basis, implements a compliance control policy to capture the target object. Because a position and a posture of the robot arm change greatly throughout a whole process, the six-dimensional force sensor needs to filter out a weight, a bias, and the like of a load end of the sensor during an entire force measurement process. In addition, in the force feedback teleoperation, the force sensor needs to effectively sense a weight of a captured target object. Therefore, the six-dimensional force sensor needs to be accurately calibrated, so as to remove impact of the weight of the six-dimensional force sensor itself and forces generated when moving in different postures on a final measurement result. Therefore, it is necessary to provide a calibration solution when a moment sensor is applied in different applications, so that the six-dimensional force sensor can be used more conveniently, to effectively detect external acting forces and moments.

In a related technology, in most cases in which a six-dimensional force sensor is used, a zeroing operation is directly performed on the six-dimensional force sensor. That is, in a specific working posture, a zeroing operation is performed on the end six-dimensional force sensor. However, in an actual use process, the force sensor is affected by the weight of the force sensor itself, its load weight, and the like, so that measurement results of the force sensor in different postures are different. Therefore, in a manner of directly performing a zeroing operation in the related technology, a robot arm cannot continuously move in an all-posture direction in an entire workspace. Currently, there is no specific solution for a method for effectively detecting a force or a moment by removing a bias, a load weight, a weight, a zero drift, or the like during continuous motion in the all-posture direction.

Based on the foregoing at least one problem existing in the related technology, the embodiments of this application provide a sensor calibration method and a data measurement method. In the methods, calibration of a sensor is divided into static calibration and dynamic calibration. A static force of the sensor in a static state and having no external acting force, and a dynamic force of the sensor in a motion state and having no external acting force are separately acquired, equivalent calibration processing is performed on a gravity and the static force, to obtain a calibrated static force, and then zero drift processing is performed on the dynamic force based on the calibrated static force. In this way, the forces of the sensor in both the static state and the motion state are calibrated, so that static calibration and dynamic calibration are implemented, and the forces of the sensor in different postures can be calibrated accurately, and the sensor can accurately and directly detect external acting forces and moments in different postures. According to the method in the embodiments of this application, static calibration can effectively filter out a bias, a load weight, a weight, and the like of the static calibration in different postures, and dynamic calibration can effectively filter out a zero drift of the sensor and the like.

The following describes an exemplary application of a sensor calibration device provided in an embodiment of this application. The sensor calibration device provided in this embodiment of this application may be implemented as various types of terminals such as an industrial robot, a notebook computer, a tablet computer, a desktop computer, a mobile device (for example, a mobile phone, a portable music player, a personal digital assistant, a dedicated messaging device, and a portable game device), or may be implemented as a server. The following describes exemplary applications when both the sensor calibration device and a data measurement device are implemented as servers. In some other embodiments, the provided data measurement device may also be implemented as various types of terminals such as an industrial robot, a notebook computer, a tablet computer, a desktop computer, a mobile device (for example, a mobile phone, a portable music player, a personal digital assistant, a dedicated messaging device, and a portable game device), or may be implemented as a server.

FIG. 1 is a schematic architecture diagram of a sensor calibration system 10 according to an embodiment of this application. The sensor calibration system 10 includes a sensor 100, a network 200, a server 300, and a terminal 400. The sensor 100 is configured to: measure a static force in response to the sensor 100 being in a static state and having no external acting force, and a dynamic force in response to the sensor 100 being in a motion state and having no external acting force, and send the static force and the dynamic force to the server 300 by using the network 200. The server 300 further acquires a gravity of the sensor itself, performs equivalent calibration processing on the static force according to the gravity to obtain a calibrated static force, and then performs zero drift processing on the dynamic force according to the calibrated static force to obtain a calibrated dynamic force. Finally, the calibrated dynamic force is used as a calibration parameter used for performing calibration in a case that the sensor 100 measures an external acting force, and the calibration parameter is sent to the terminal 400 by using the network 200. A current interface 400-1 of the terminal 400 may display the static force and the dynamic force that are measured by the sensor 100, and may also display an output value of the sensor 100 when measuring an external acting force. In the embodiment of this application, the network 200 may be a wide area network or a local area network, or a combination thereof.

Figure 2:
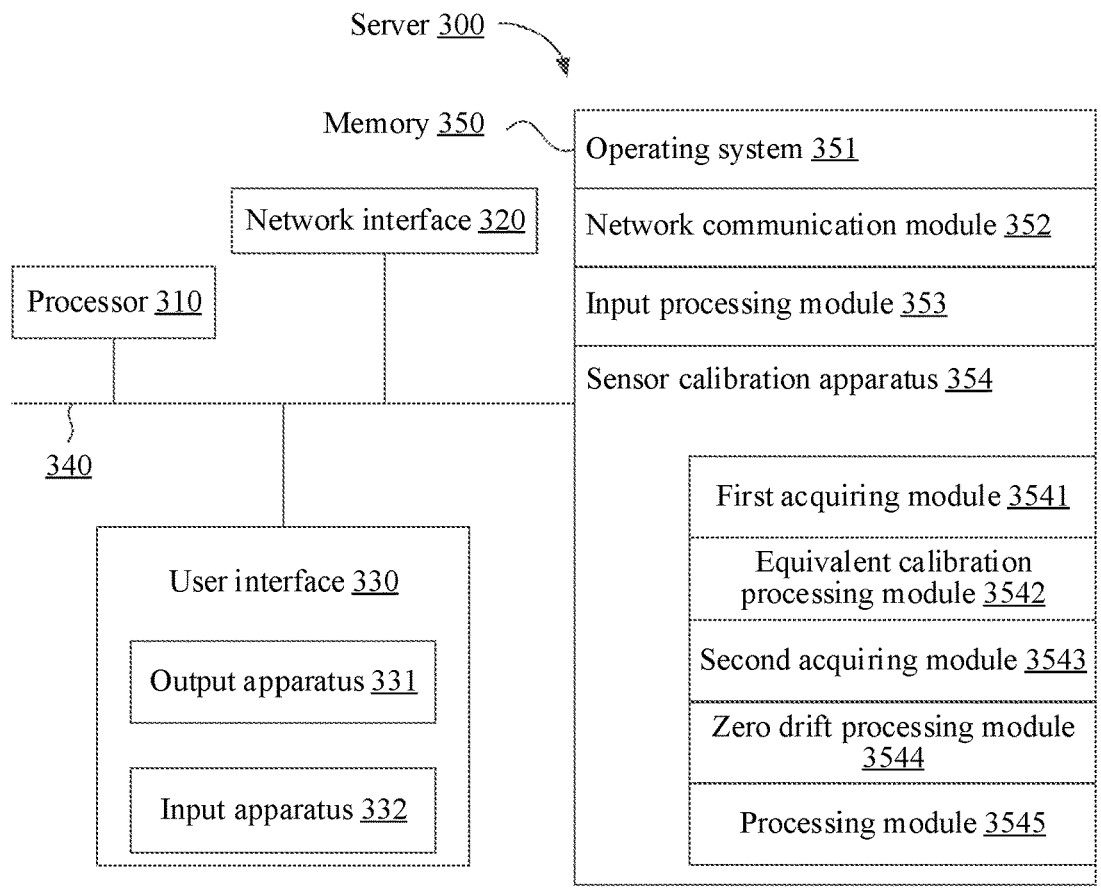
FIG. 2 is a schematic structural diagram of a server according to an embodiment of this application.

FIG. 2 is a schematic structural diagram of a server 300 according to an embodiment of this application. The server 300 shown in FIG. 2 includes at least one processor 310, a memory 350, at least one network interface 320, and a user interface 330. All components of the server 300 are coupled together through a bus system 340. The bus system 340 is used for achieving connection and communication of these components. In addition to including a data bus, the bus system 340 further includes a power supply bus, a control bus, and a state signal bus. However, in order to describe more clearly, all various buses are marked as the bus system 340 in FIG. 2.

The processor 310 may be an integrated circuit chip and has a signal processing ability, such as a universal processor, a digital signal processor (DSP), or other programmable logic devices and separate gates, or transistor logic devices and separate hardware components, where the universal processor may be a micro processor or any conventional processor, and the like.

The user interface 330 includes one or more output apparatuses 331 that may present media content, including one or more speakers and/or one or more visual display screens. The user interface 330 further includes one or more input apparatuses 332, including a user interface component helpful for inputting of a user, such as a keyboard, a mouse, a touch display screen, a camera, or other input buttons and control components.

Exemplary hardware equipment includes a solid storage device, a hard disk driver, and the like. The memory 350 may optionally include one or more storage devices that are physically away from the processor 310. The memory 350 includes a volatile memory or a non-volatile memory, or may include a volatile memory and a non-volatile memory. The non-volatile memory may be a read-only memory (ROM), and the volatile memory may be a random access memory (RAM). The memory 350 described in the embodiments of this application aims to including any memory of an appropriate type. In some embodiments, the memory 350 may store data to support various operations, an example of the data includes a program, a module, a data structure, or a subset or a super set thereof, and the following is an exemplary description.

An operation system 351 includes a system program configured to process various basic system services and perform a hardware-related task, such as a framework layer, a core library layer, a driver layer, and the like, to implement various basic services and process a task based on hardware.

A network communication module 352 is configured to: reach other computing devices through one or more (wired or wireless) network interfaces 320, and an exemplary network interface 320 includes: bluetooth, wireless fidelity (WiFi), a universal serial bus (USB), and the like.

An input process module 353 is configured to: detect one or more input or interaction of one or more users from one of the one or more input apparatuses 332, and translate the detected input or interaction.

In some embodiments, the apparatus provided in this embodiment of this application may be implemented in a software manner. FIG. 2 shows a sensor calibration apparatus 354 stored in the memory 350. The sensor calibration apparatus 354 may be a sensor calibration apparatus in the server 300. The sensor calibration apparatus 354 may be software in a form of a program and a plug-in, and includes the following software modules: a first acquiring module 3541, an equivalent calibration processing module 3542, a second acquiring module 3543, a zero drift processing module 3544, and a processing module 3545. These modules are logically implemented, and therefore, any combination or further division may be performed according to implemented functions. The following describes a function of each of the modules.

In some other embodiments, the apparatus provided in the embodiments of this application may be implemented in a hardware manner. As an example, the apparatus provided in the embodiments of this application may be a processor in a form of a hardware decoding processor, which is programed to perform the sensor calibration method provided in the embodiments of this application. For example, the processor in a form of the hardware decoding processor may adopt one or more application specific integrated circuits (ASIC), DSP, programmable logic devices (PLD), complex programmable logic devices (CPLD), field-programmable gate arrays (FPGA), or other electronic elements.

The sensor calibration method provided in this embodiment of this application further relates to the field of cloud technologies, and may be implemented based on a cloud platform and by using a cloud technology. For example, the server 300 may be a cloud server, and the cloud server is corresponding to a cloud memory. A correspondence among a calibration parameter, a calibration parameter, and a sensor that are obtained after sensor calibration is performed may be stored in the cloud memory. Cloud technology refers to unify a series of resources such as hardware or software or networks in a wide area network or a local area network, to achieve hosting technologies of computing, storing, processing, and sharing of data. Cloud technology is a general term based on network technology, information technology, integration technology, management platform technology, and application technology applied in a cloud computing business model. Cloud technology may form a resource pool, which may be used as needed, and flexible and convenient. Cloud technology is becoming important support. The background service of the technical network system requires a large amount of computing and storage resources, such as video websites, image websites and more portal websites. With the rapid development and application of the Internet industry, in the future, each item may have its own identification mark and needs to be transmitted to the background system for logical processing. Data of different levels is processed separately, and all types of industry data need to be supported by a powerful system, which can only be achieved through cloud computing.

Cloud storage is a new concept extended and developed on a concept of cloud computing. A distributed cloud storage system (hereinafter referred to as a storage system) refers to a storage system that combines various storage devices (also referred to as storage nodes) in a network by using functions such as a cluster application, a grid technology, and a distributed storage file system, to work together by using application software or application interfaces to provide data storage and service access functions to the outside.

The sensor calibration method and the data measurement method provided in the embodiments of this application may be further applied to the artificial intelligence field. For example, the sensor calibration method and the data measurement method may be applied to calibration of a six-dimensional force sensor at an end of a robot arm based on an artificial intelligence technology. By accurately calibrating the six-dimensional force sensor at the end of the robot arm, a force collected by the six-dimensional force sensor can be accurately acquired by the robot, so that the robot can accurately determine and control a next action of the robot by using the artificial intelligence technology according to the collected force.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing technology, machine learning/deep learning, and the like.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific subject, CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biometric feature recognition technologies such as common face recognition and fingerprint recognition.

The key technologies of speech technology include automatic speech recognition technology (ASR), speech synthesis technology (TTS), and voiceprint recognition technology. To enable computers to be able to listen, see, speak, and feel is the future development direction of human-computer interaction, among which voice has become one of the most promising human-computer interaction methods in the future.

NLP is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

Machine learning (ML) is a multi-field interdiscipline and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Autonomous driving technology usually includes high-precision maps, environment perception, behavior decision-making, path planning, motion control and other technologies. Self-determined driving technology has a wide range of application prospects.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

Figure 3:
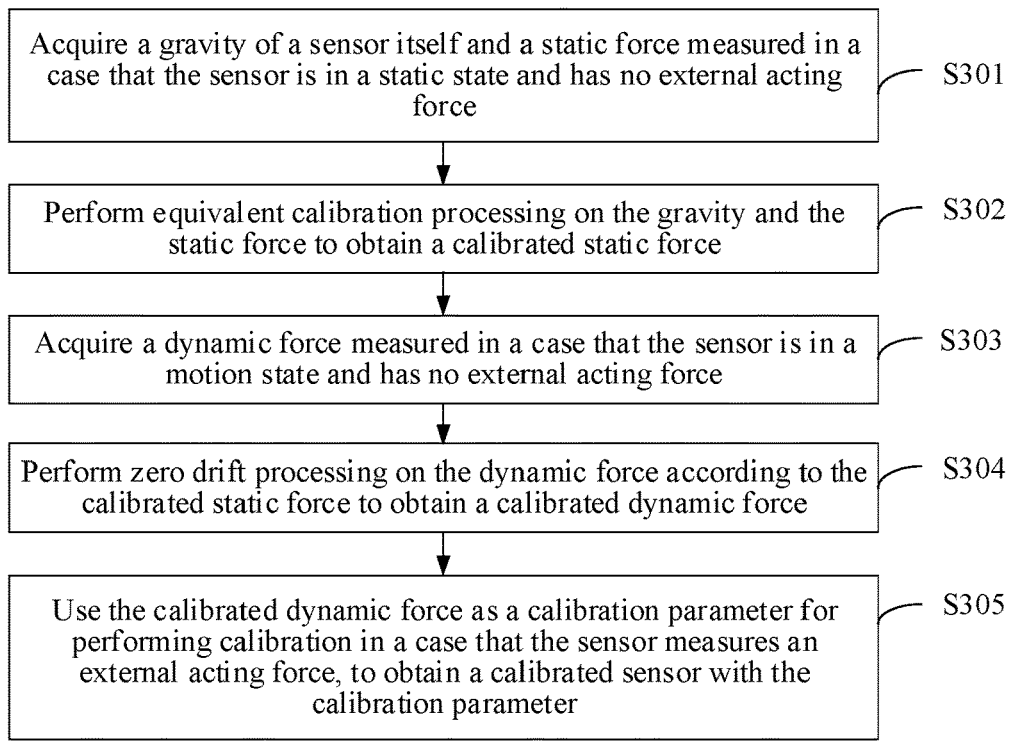
FIG. 3 is a schematic flowchart of a sensor calibration method according to an embodiment of this application.

The solutions provided in the embodiments of this application relate to the robot field of artificial intelligence, and mainly relate to calibration of a six-dimensional force sensor at an end of a robot arm. The following embodiments are used for description:

The sensor calibration method provided in the embodiments of this application may be performed by an electronic device. In some embodiments, the electronic device may be a server. The sensor calibration method provided in the embodiment of this application is described below with reference to the exemplary application and implementation of the server 300 provided in the embodiment of this application. FIG. 3 is a schematic structural diagram of the sensor calibration method according to an embodiment of this application, which is described with references to steps shown in FIG. 3.

Step S301: Acquire a gravity of a sensor itself and a static force measured in response to the sensor being in a static state and having no external acting force.

Herein, the gravity of the sensor includes a gravity formed by a weight of a sensor body and a weight of an end effecter body connected to the sensor, that is, the gravity of the sensor is an equivalent gravity of the weight of the sensor body and the weight of the end effecter body.

The sensor may be a force sensor installed on a robot arm based on an artificial intelligence technology, for example, may be a six-dimensional force sensor installed at an end of the robot arm.

The static force refers to a force in event that the sensor is in the static state and the sensor does not detect an external force. The static state refers to that the robot arm on which the sensor is installed does not move. In this case, the sensor may be vertically upward or vertically downward or have a certain angle with a horizontal plane. In this embodiment of this application, in response to the sensor being in the static state and having no external acting force, a reading of the sensor is recorded, and the reading is the static force. The static force includes a force and a moment that are caused by the gravity of the sensor, and may further include a sensor biasing force and a biasing moment.

Step S302: Perform equivalent calibration processing on the gravity and the static force to obtain a calibrated static force.

Herein, equivalent calibration processing is a form in which the gravity of the sensor is equivalent to the static force. That is, the measured static force is equivalent to the gravity. In this way, when gravity calibration is performed, the static force may be used as an equivalent representation, so that the gravity of the sensor is calibrated according to the measured static force. In this embodiment of this application, after equivalent calibration processing, the gravity is calibrated by using the measured static force, so as to obtain the calibrated static force.

Step S303: Acquire a dynamic force measured in response to the sensor being in a motion state and having no external acting force.

The dynamic force refers to a force in event that the sensor is in a motion state and the sensor does not detect an external force. The motion state refers to that the robot arm on which the sensor is installed moves at a uniform speed or accelerates. In this case, the sensor may be anywhere in three-dimensional space. In this embodiment of this application, in event that the sensor is in the motion state and has no external acting force, a reading of the sensor is recorded, and the reading is the dynamic force. The dynamic force includes a force and a moment caused by sensor noise, an inertia force during sensor movement, a zero drift of the sensor, and the like.

Step S304: Perform zero drift processing on the dynamic force according to the calibrated static force to obtain a calibrated dynamic force.

Herein, in event that the sensor is applied to the robot, a movement of the robot arm is a movement at a normal speed of the robot arm, and therefore there is no obvious acceleration and deceleration. Therefore, an inertia force in a movement process of the sensor is basically zero, which may be ignored. For the force and the moment caused by sensor noise and the zero drift of the sensor, zero drift processing in this embodiment of this application may be used for calibration.

In this embodiment of this application, dynamic force calibration is performed after static force calibration is completed, because in this case, the gravity of the sensor and the bias of the sensor are both zero because static force calibration has been performed. Therefore, during the movement process of the sensor, the gravity and the biasing force do not affect measurement of the dynamic force of the sensor. Therefore, in this case, the measured dynamic force includes only the force and the moment caused by sensor noise and the zero drift of the sensor.

Step S305: Use the calibrated dynamic force as a calibration parameter to perform calibration in response to the sensor measuring an external acting force, to obtain a calibrated sensor with the calibration parameter.

In this embodiment of this application, after the dynamic force is calibrated, the calibrated dynamic force is used as a calibration parameter of the sensor. In this way, in a subsequent measurement process, the sensor may automatically obtain an actual value of the measured external force according to the calibration parameter and the measurement value. In an implementation process, the calibration parameter may be subtracted from a measurement value measured by the sensor, so as to obtain the actual value of the external force.

According to the sensor calibration method provided in this embodiment of this application, the static force and the dynamic force of the sensor that is in the static state and has no external acting force and in the motion state and has no external acting force are separately acquired, equivalent calibration processing is performed on the gravity and the static force, to obtain the calibrated static force, and then zero drift processing is performed on the dynamic force based on the calibrated static force. In this way, because the forces of the sensor in both the static state and the motion state are calibrated, calibration processing is implemented for forces of the sensor in different postures, so that the sensor can be accurately calibrated, and external acting forces and moments can be accurately and directly detected in different postures by the sensor.

Figure 4:
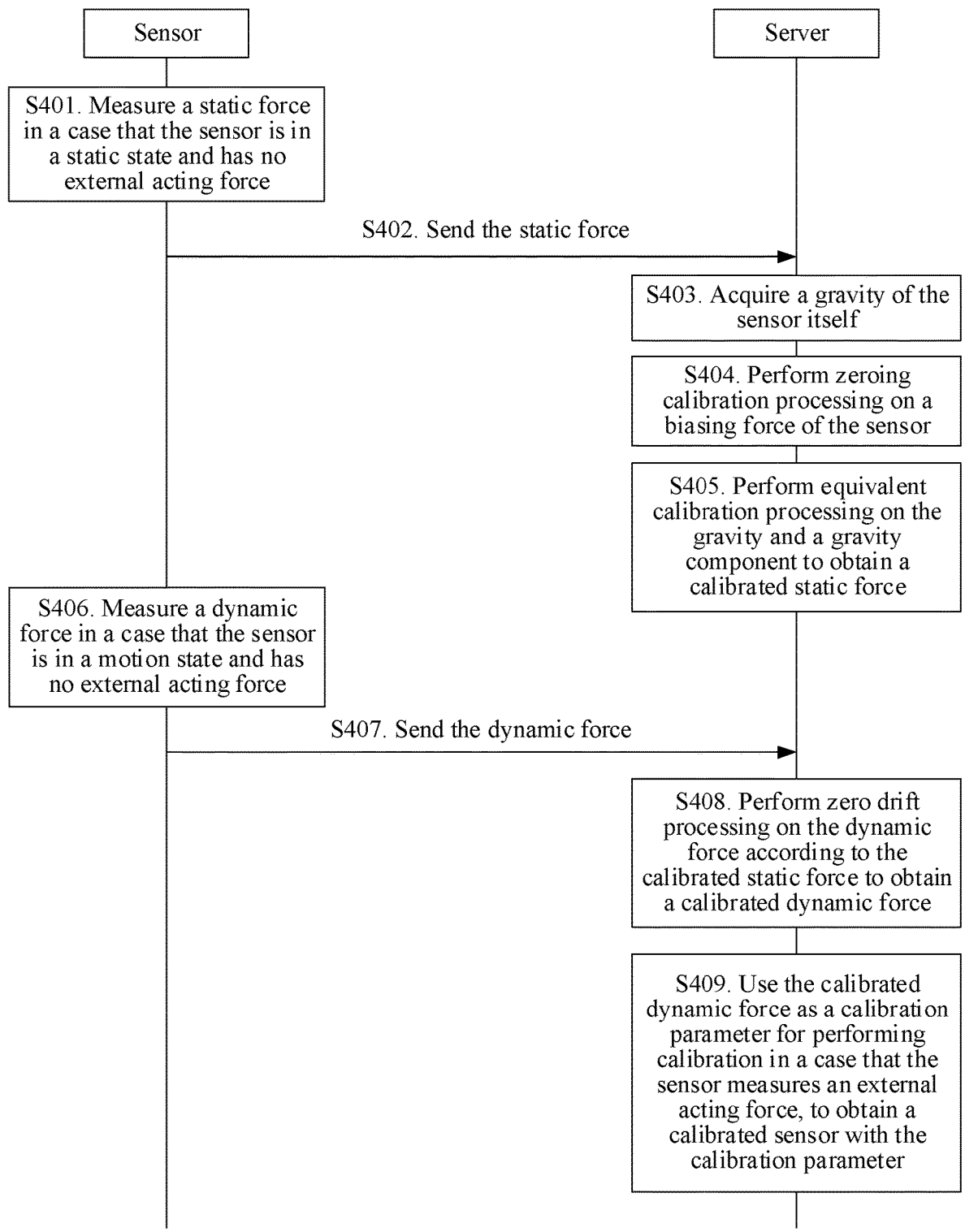
FIG. 4 is a schematic flowchart of a sensor calibration method according to an embodiment of this application.

In some embodiments, the sensor calibration system includes a sensor and a server, and the sensor sends a measured value to the server, so as to implement the sensor calibration method in this embodiment of this application by using the server. FIG. 4 is a schematic flowchart of a sensor calibration method according to an embodiment of this application. As shown in FIG. 4, the method includes the following steps:

Step S401: The sensor measures a static force in response to the sensor being in a static state and having no external acting force.

Step S402: The sensor sends the measured static force to the server.

Herein, the static force includes a gravity component caused by a gravity of the sensor itself and a biasing force of the sensor.

Step S403: The server acquires the gravity of the sensor itself.

Step S404: The server performs zeroing calibration processing on the biasing force of the sensor.

In some embodiments, when the biasing force of the sensor is calibrated, the measured biasing force can be directly subtracted. In an implementation process, the biasing force of the sensor may be a constant bias, that is, after the sensor is installed on a robot arm, even if no load is attached (the load herein includes a force captured by an end effecter and the end effecter), but the sensor is still in a current position, the reading of the sensor is not zero, that is, even if there is no zero drift of the sensor, the reading of the sensor is not zero. In this case, the reading is the biasing force of the sensor. For example, in a case that the sensor is not loaded and is still in the current position, and the sensor reads 10N, it may be considered that the biasing force of the sensor is 10N. Therefore, when the biasing force of the sensor is calibrated, a force of 10N may be directly subtracted.

In some other embodiments, the biasing force of the sensor may also be calibrated by using a position of the sensor in a three-dimensional coordinate system. In an implementation process, an X-axis, a Y-axis, and a Z-axis of the sensor may be first determined, and then the X-axis, the Y-axis, and the Z-axis of the sensor are respectively vertically upward or vertically downward, and the reading of the sensor in each position is acquired. In this way, the constant bias of the sensor may be determined by using the reading, and biasing force calibration is further performed according to the determined constant bias.

Step S405: The server performs equivalent calibration processing on the gravity and the gravity component to obtain a calibrated static force.

The gravity component of the sensor is a load of a certain weight mounted on the sensor, for example, a load caused by the gravity of the end effecter connected to the sensor and the weight of the sensor itself. A gravity component of the end effecter connected to the sensor is related to a current posture of the sensor, and the current posture of the sensor may include a load on a sensor end, a screw, and the load of the sensor itself. These loads constitute a unified load whole, which is equivalent to that a load installed at the sensor end, the screw, and the load of the sensor itself are equivalent to one mass object. In this case, a weight equivalent to the gravity G may be determined based on that the sensor is vertically upward or downward, so as to obtain a gravity component of the gravity G in a three-dimensional coordinate system.

In this embodiment of this application, the gravity G is known, and may be calculated according to the current posture of the sensor. After the gravity G is calibrated, the gravity of the sensor can be calibrated by subtracting the gravity G according to a current real-time posture of the sensor.

Step S406: The sensor measures a dynamic force in response to the sensor being in a motion state and having no external acting force.

Step S407: The sensor sends the dynamic force to the server.

Step S408: The server performs zero drift processing on the dynamic force according to the calibrated static force to obtain a calibrated dynamic force.

Step S409: The server uses the calibrated dynamic force as a calibration parameter for performing calibration in response to the sensor measuring an external acting force, to obtain a calibrated sensor with the calibration parameter.

According to the sensor calibration method provided in this embodiment of this application, the sensor separately measures, in the static state, the gravity component and the biasing force of the sensor that are caused by the gravity of the sensor, so that the server can successively calibrate the biasing force and the gravity component to obtain the calibrated static force, and the sensor measures the dynamic force in the motion state, so that the server can perform zero drift processing on the dynamic force according to the calibrated static force, so as to obtain the calibrated dynamic force. In this way, the server calibrates both the biasing force and the gravity component of the sensor in the static state and the dynamic force in the motion state, so that calibration processing can be performed on forces in different postures of the sensor, so that the sensor can accurately and directly detect external acting forces and moments in different postures.

In some embodiments, in event that the sensor is in the static state, the sensor includes a first position posture in a three-dimensional coordinate system and a second position posture in the three-dimensional coordinate system, where the first position posture may be a vertical downward position posture of the sensor, and the second position posture may be a vertical upward position posture of the sensor.

Figure 5:
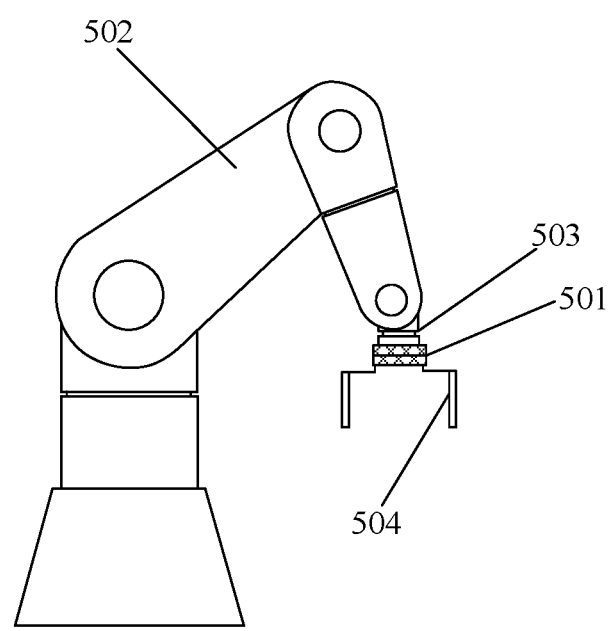
FIG. 5 is a schematic structural diagram of a sensor in a first position posture according to an embodiment of this application.

FIG. 5 is a schematic structural diagram of a sensor in a first position posture according to an embodiment of this application. A sensor 501 is installed at an end of a robot arm 502. The sensor 501 connects one end of the sensor 501 to the robot arm 502 by using a flange 503 at the end of the robot arm, the other end of the sensor 501 is connected to an end effecter 504, and the end effecter 504 is configured to implement operations such as robot capture. The robot may be an intelligent robot or an industrial robot that implements an intelligent operation or intelligent control based on an artificial intelligence technology.

As shown in FIG. 5, the sensor 501 is in a vertical downward position posture. In this case, a gravity of the sensor includes a gravity formed by a weight of the sensor

501 body and a weight of the end effecter 504 body, that is, the gravity of the sensor 501 body is an equivalent gravity of the weight of the sensor 501 body and the weight of the end effecter 504 body. In event that the sensor 501 is in a vertical downward position posture, in this case, in a three-dimensional coordinate system, the sensor 501 has a gravity component only on the Y-axis in the vertical direction, and gravity components on both the X-axis and the Z-axis are 0.

FIG. 5 shows only a case in which the sensor 501 is in the first position posture. Certainly, the sensor 501 may be in a second position posture, and the second position posture is a vertical upward position posture of the sensor.

Figure 6:
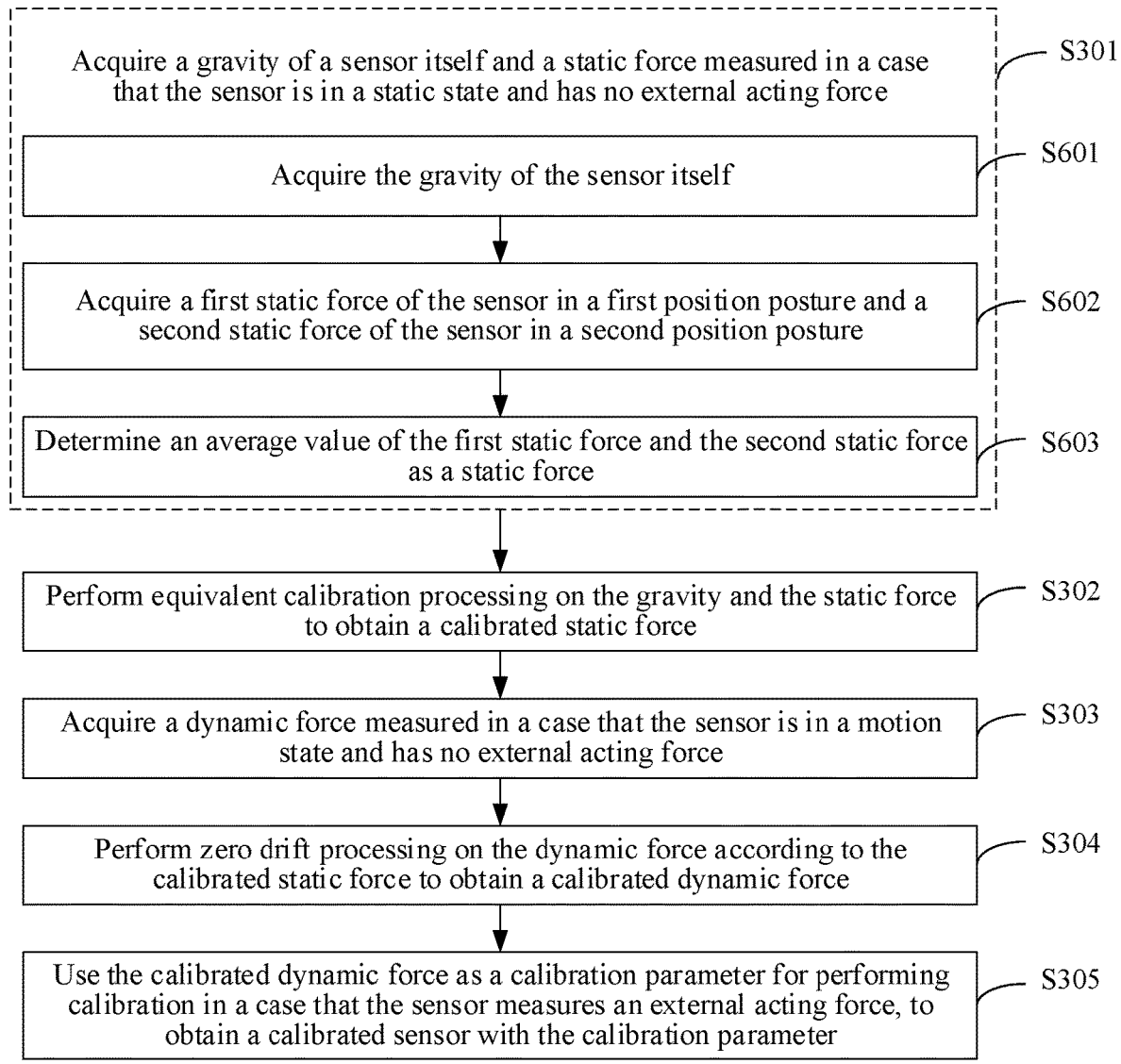
FIG. 6 is a schematic flowchart of a sensor calibration method according to an embodiment of this application.

Based on the method in FIG. 3 and the first position gesture and the second position gesture in FIG. 5, as shown in FIG. 6, FIG. 6 is a schematic flowchart of a sensor calibration method according to an embodiment of this application. Step S301 may be implemented by using the following steps:

Step S601: Acquire a gravity of the sensor.

Step S602: Acquire a first static force of the sensor in the first position posture and a second static force of the sensor in the second position posture.

Herein, the first static force is measured in the first position posture, and the second static force is measured in the second position posture.

Step S603: Determine an average value of the first static force and the second static force as a static force.

Figure 7:
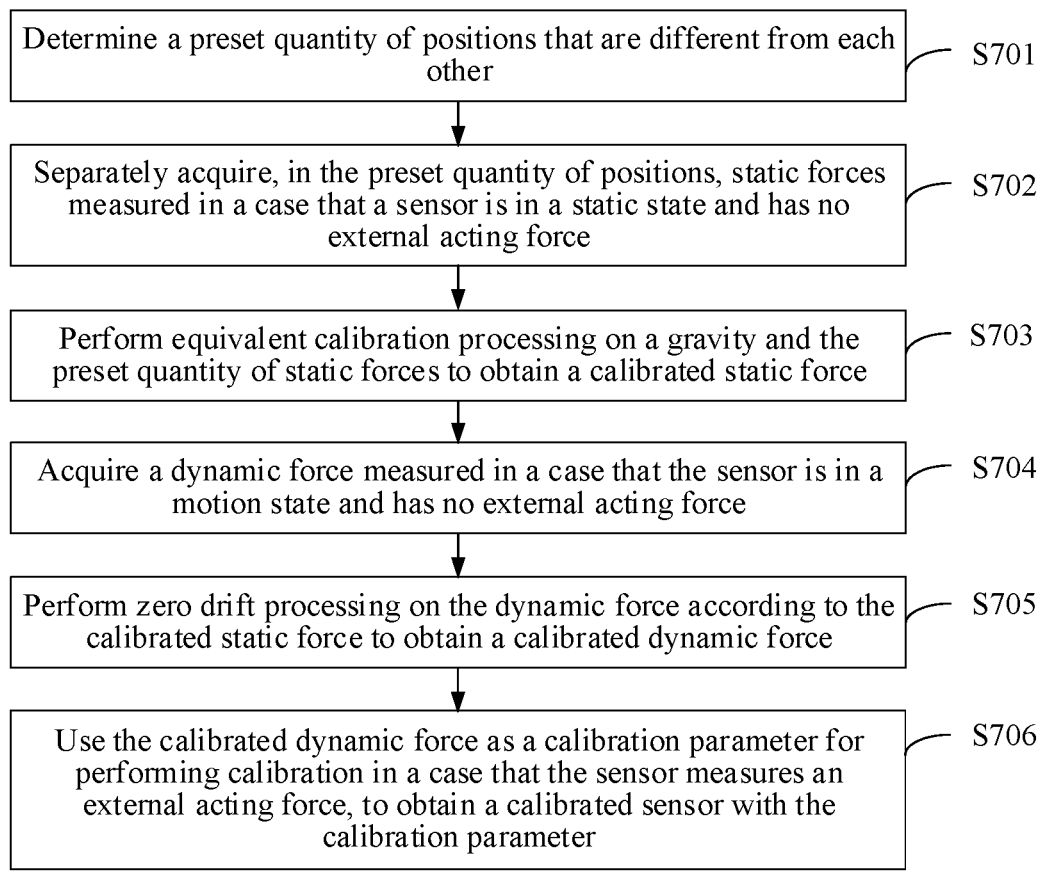
FIG. 7 is a schematic flowchart of a sensor calibration method according to an embodiment of this application.

In some embodiments, the sensor may be calibrated according to a preset quantity of static forces. As shown in FIG. 7, FIG. 7 is a schematic flowchart of a sensor calibration method according to an embodiment of this application. The method includes the following steps:

Step S701: Determine a preset quantity of positions that are different from each other.

Herein, the preset quantity may be determined according to a calculation requirement. For example, the preset quantity may be determined as 6, and six different positions may be selected.

Step S702: Separately acquire, in the preset quantity of positions, static forces measured in a case that the sensor is in a static state and has no external acting force.

Herein, static forces are separately acquired in a case that the sensor is in each position.

Step S703: Perform equivalent calibration processing on the gravity and the preset quantity of static forces to obtain a calibrated static force.

Herein, after the preset quantity of static forces are acquired, equivalent calibration processing is performed according to the gravity and the preset quantity of static forces, that is, equivalent calibration processing is performed on the gravity and all the static forces to obtain the calibrated static force. Step S703 may be implemented by using the following steps:

S7031. Perform data conversion processing on the gravity and the preset quantity of static forces to obtain a criterion function. S7032. Perform minimization processing on the criterion function by using a least square method, to obtain the calibrated static force.

Step S704: Acquire a dynamic force measured in response to the sensor being in a motion state and having no external acting force.

Step S705: Perform zero drift processing on the dynamic force according to the calibrated static force to obtain a calibrated dynamic force.

Step S706: Use the calibrated dynamic force as a calibration parameter for performing calibration in response to the sensor measuring an external acting force, to obtain a calibrated sensor with the calibration parameter.

According to the sensor calibration method provided in this embodiment of this application, the preset quantity of static forces is acquired to perform sensor calibration. In this way, the calibrated static force and the calibrated dynamic force can be more accurately obtained, so as to obtain a more accurate calibration parameter, and implement accurate calibration on the sensor.

Figure 8:
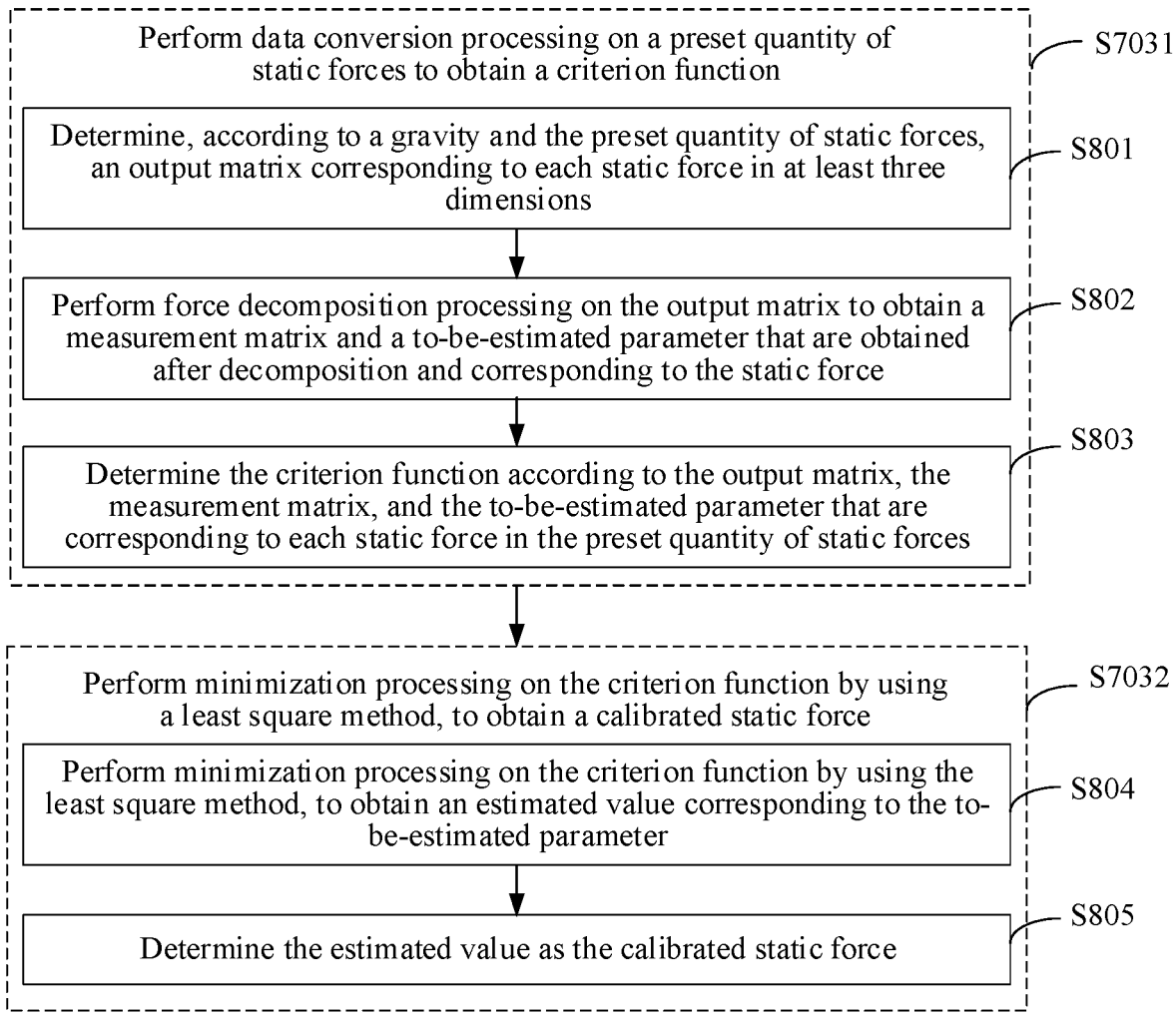
FIG. 8 is a schematic flowchart of a sensor calibration method according to an embodiment of this application.

FIG. 8 is a schematic flowchart of a sensor calibration method according to an embodiment of this application. As shown in FIG. 8, step S7031 may be implemented by using the following steps:

Step S801: Determine, according to the gravity and the preset quantity of static forces, an output matrix corresponding to each static force in at least three dimensions.

Step S802: Perform force decomposition processing on the output matrix to obtain a measurement matrix and a to-be-estimated parameter that are obtained after decomposition and corresponding to the static force.

Step S803: Determine the criterion function according to the output matrix, the measurement matrix, and the to-be-estimated parameter that are corresponding to each static force in the preset quantity of static forces.

Continue to refer to FIG. 8. Step S7032 may be implemented by using the following steps:

Step S804: Perform minimization processing on the criterion function by using the least square method, to obtain an estimated value corresponding to the to-be-estimated parameter.

Step S805: Determine the estimated value as the calibrated static force.

Figure 9:
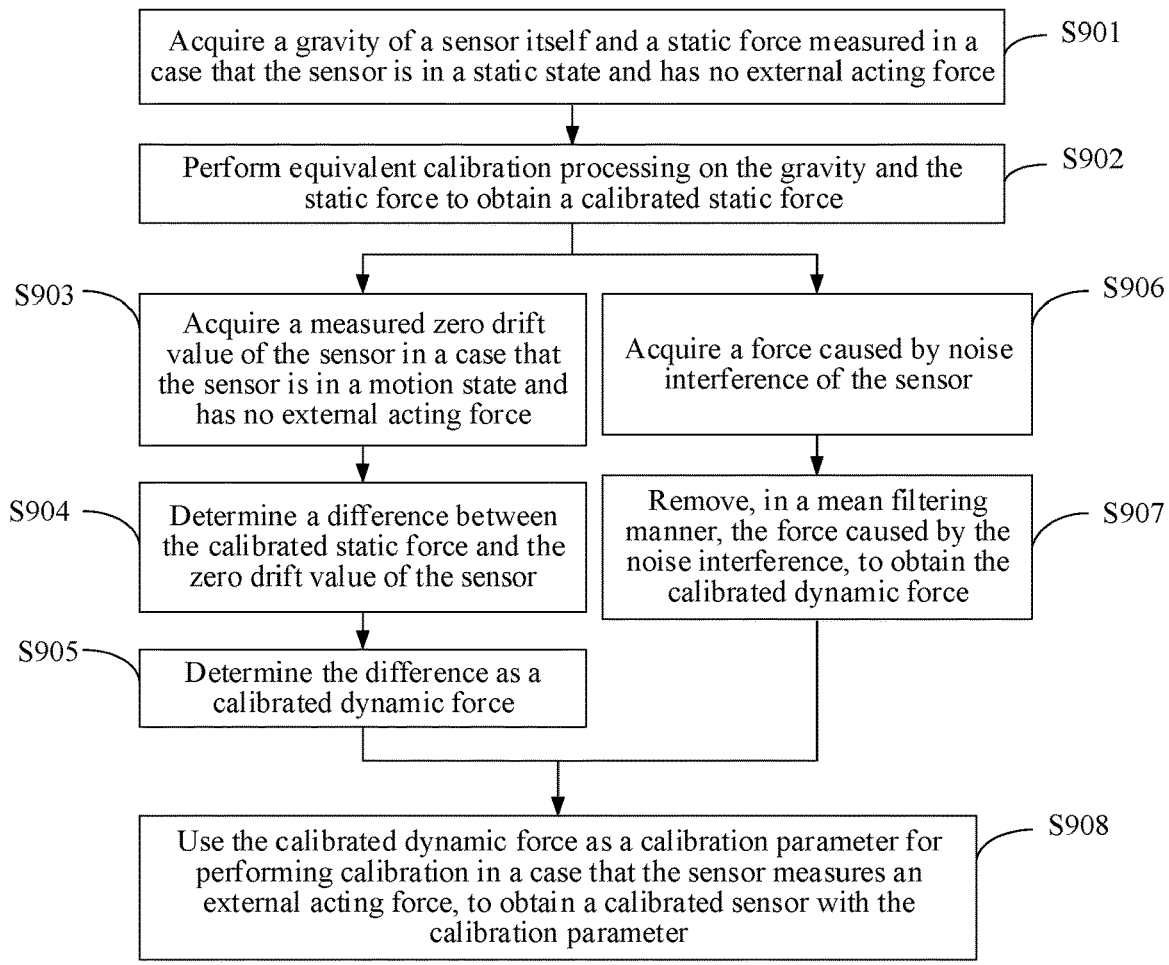
FIG. 9 is a schematic flowchart of a sensor calibration method according to an embodiment of this application.

In some embodiments, the dynamic force includes a zero drift value of the sensor. Therefore, when dynamic force calibration is performed, the zero drift value of the sensor needs to be calibrated. As shown in FIG. 9, FIG. 9 is a schematic flowchart of a sensor calibration method according to an embodiment of this application. The method includes the following steps:

Step S901: Acquire a gravity of a sensor itself and a static force measured in response to the sensor being in a static state and having no external acting force.

Herein, the sensor may be a six-dimensional force sensor. Then, the static force includes three static force components in a three-dimensional coordinate direction and three static moment components in the three-dimensional coordinate direction; and the dynamic force includes three dynamic force components in the three-dimensional coordinate direction and three dynamic moment components in the three-dimensional coordinate direction.

Figure 10:
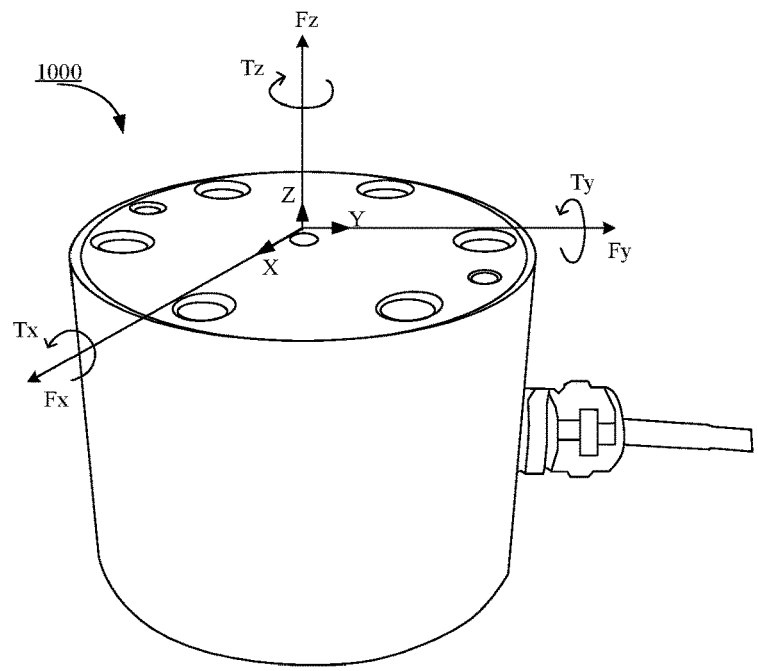
FIG. 10 is a force diagram of a six-dimensional force sensor according to an embodiment of this application.

FIG. 10 is a force diagram of a six-dimensional force sensor according to an embodiment of this application. As shown in FIG. 10, a static force of a six-dimensional sensor 1000 includes three force components Fx, Fy, and Fz in three directions: an X-axis, a Y-axis, and a Z-axis, and three moment components Tx, Ty, and Tz in the three directions: the X-axis, the Y-axis, and the Z-axis. When the six-dimensional force sensor is in a static state, the three force components are three static force components, and the three moment components are three static moment components. When the six-dimensional force sensor is in a motion state, the three force components are three dynamic force components, and the three moment components are three dynamic moment components.

Step S902: Perform equivalent calibration processing on the gravity and the static force to obtain a calibrated static force.

Step S903: Acquire a measured zero drift value of the sensor in response to the sensor being in a motion state and having no external acting force.

Step S904: Determine a difference between the calibrated static force and the zero drift value of the sensor.

Herein, the zero drift value of the sensor is calibrated after the static force is calibrated, that is, within a relatively short time, several fixed forces (for example, sensor bias and sensor gravity) in the static force are first calibrated. After the static force is calibrated, the zero drift value is not present by default in the current calibration process. In this case, if the sensor can detect the zero drift value, it indicates that the zero drift value needs to be calibrated.

For example, after the static force is calibrated, an outputted reading of the sensor placed in the current position is to be 0N. However, actually, an outputted reading is 10N. In this case, it may be considered that the reading 10N is a zero drift value, and 10N may be subtracted to complete calibration of the zero drift value of the sensor.

Step S905: Determine the difference as the calibrated dynamic force.

In some embodiments, the dynamic force may further include a force caused by noise interference. In this case, the method further includes step S906: acquire a force caused by noise interference of the sensor.

Step S907: Remove, in a mean filtering manner, the force caused by the noise interference, to obtain the calibrated dynamic force.

The mean filtering is also referred to as linear filtering. A main method used by the mean filtering is a neighborhood average method. A basic principle of the mean filtering is to replace each piece of data in original data with an average value. In this embodiment of this application, an average value of forces caused by noise in a period of time may be calculated, and then the average value is used as the calibrated dynamic force.

Step S908: Use the calibrated dynamic force as a calibration parameter for performing calibration in response to the sensor measuring an external acting force, to obtain a calibrated sensor with the calibration parameter.

Figure 11:
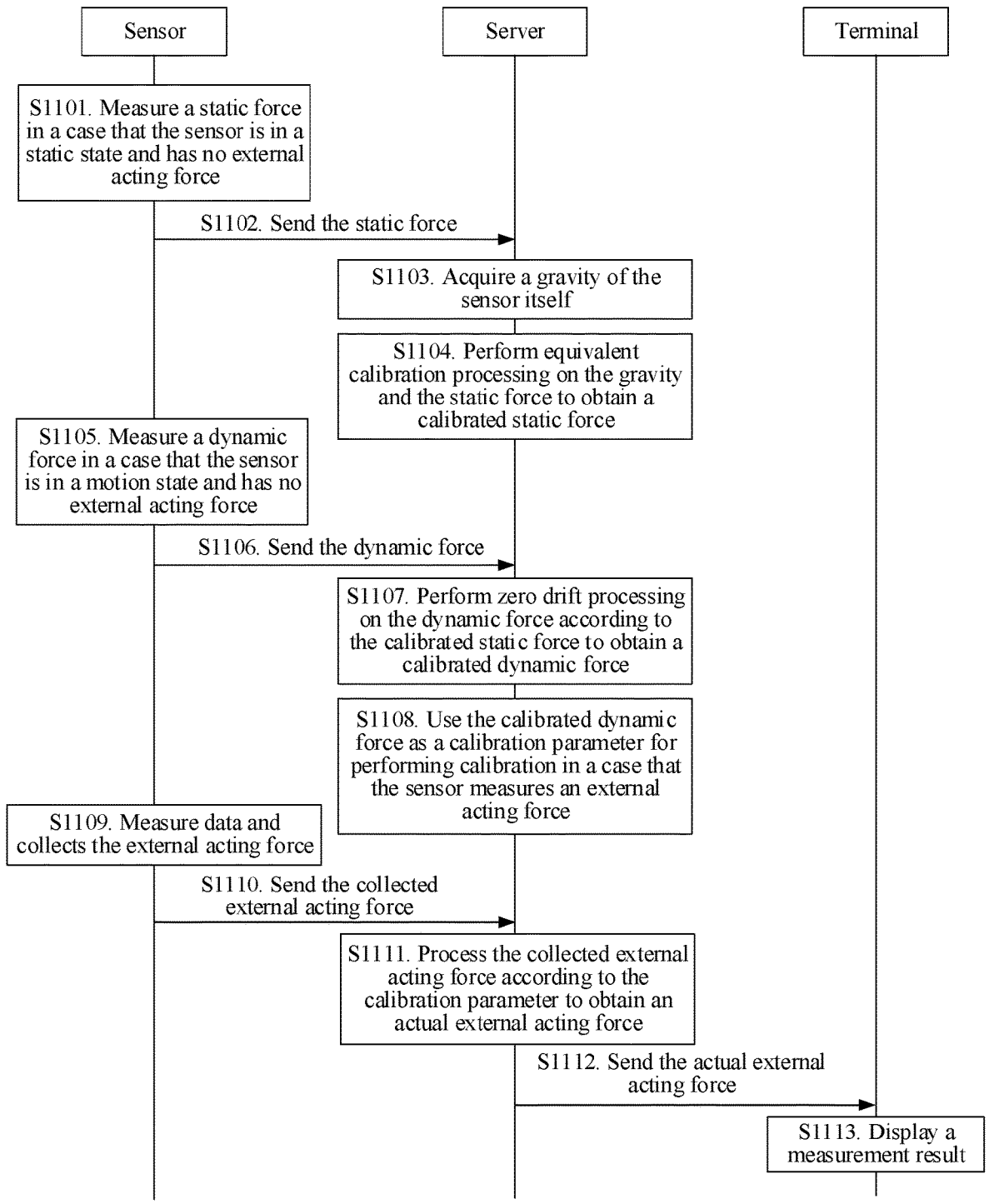
FIG. 11 is a schematic flowchart of a data measurement method according to an embodiment of this application.
Figure 12:
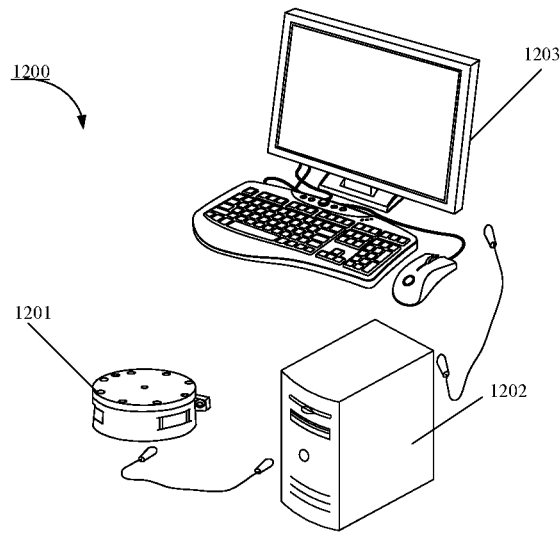
FIG. 12 is a schematic structural diagram of a data measurement system according to an embodiment of this application.

Based on the foregoing sensor calibration method, an embodiment of this application provides a data measurement method, which may be implemented by using a data measurement device. FIG. 11 is a schematic flowchart of a data measurement method according to an embodiment of this application. The method is applied to the foregoing sensor calibration method. In some embodiments, a data measurement system used for implementing the data measurement method includes a sensor, a server, and a terminal. As shown in FIG. 12, FIG. 12 is a schematic structural diagram of a data measurement system according to an embodiment of this application. A data measurement system 1200 includes a sensor 1201, a server 1202, and a terminal 1203. The server 1202 is separately connected to the sensor 1201 and the terminal 1203. The sensor 1201 is configured to perform data measurement. The server 1202 implements calibration on the sensor 1201. The terminal 1203 is configured to display a measurement result of the sensor 1201. As shown in FIG. 11, the method includes the following steps:

Step S1101: The sensor measures a static force in response to the sensor being in a static state and having no external acting force.

Step S1102: The sensor sends the measured static force to the server.

Step S1103: The server acquires a gravity of the sensor itself.

Step S1104: The server performs equivalent calibration processing on the gravity and the static force to obtain a calibrated static force.

Step S1105: The sensor measures a dynamic force in response to the sensor being in a motion state and having no external acting force.

Step S1106: The sensor sends the dynamic force to the server.

Step S1107: The server performs zero drift processing on the dynamic force according to the calibrated static force to obtain a calibrated dynamic force.

Step S1108: The server uses the calibrated dynamic force as a calibration parameter for performing calibration in response to the sensor measuring an external acting force.

Step S1109: The sensor measures data and collects the external acting force.

Step S1110: The sensor sends the collected external acting force to the server.

Step S1111: The server processes the collected external acting force according to the calibration parameter to obtain an actual external acting force.

Step S1112: The server sends the actual external acting force to the terminal.

Step S1113: The terminal displays the external acting force as a measurement result on a current interface.

In some embodiments, the sensor may have a display unit. After obtaining the actual external acting force by means of calculation, the server may send the actual external acting force to the sensor, so as to display the measurement result on the display unit of the sensor.

In some other embodiments, after obtaining the calibration parameter, the server sends the calibration parameter to the sensor, and performs interference force calibration on the sensor, so that the sensor is in a calibrated state. In this way, when collecting an external acting force in a later period, the sensor may collect data in the calibrated state, so that the sensor can directly collect a value of the actual external acting force.

Figure 13:
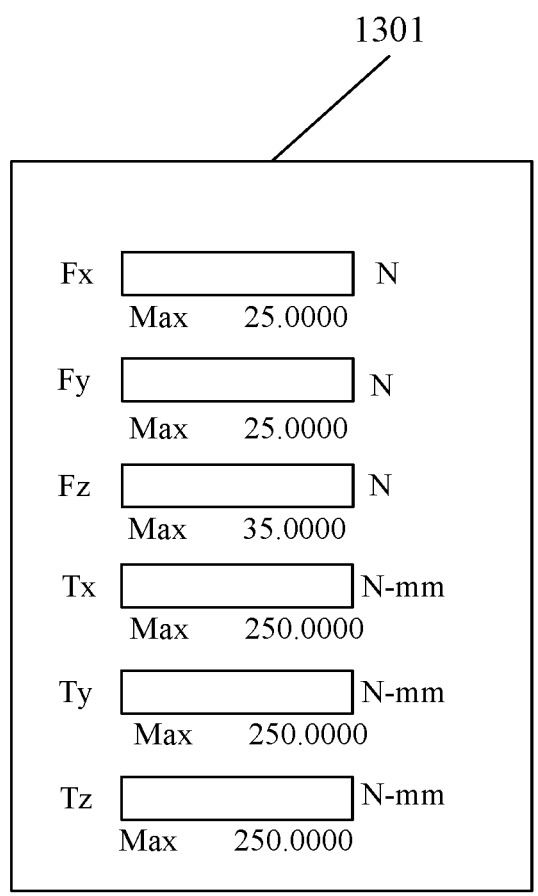
FIG. 13 is an interface diagram of displaying a measurement result by a terminal according to an embodiment of this application.

FIG. 13 is an interface diagram of displaying a measurement result by a terminal according to an embodiment of this application. As shown in FIG. 13, on a current interface 1301, three forces Fx, Fy, and Fz of an external acting force in three directions of an X-axis, a Y-axis, and a Z-axis in a three-dimensional coordinate system and three moments Tx, Ty, and Tz of the external acting force in the three directions of the X-axis, the Y-axis, and the Z-axis in the three-dimensional coordinate system are respectively displayed.

In other embodiments, a robot is further provided, where the robot includes a robot arm and a sensor mounted at an end of the robot arm, and the sensor may be calibrated by using the sensor calibration method provided in any one of the foregoing embodiments. After the sensor is calibrated, data measurement is performed by using the calibrated sensor to obtain an acting force of the robot when a target object is captured or operated by the robot, so as to guide movement of the robot arm and the robot.

The following describes an exemplary application of the embodiments of this application in an actual application scenario.

An embodiment of this application provides a calibration algorithm (that is, a sensor calibration method) for a robot arm end six-dimensional force sensor, so that the end six-dimensional force sensor can effectively and directly detect external acting forces and moments in different postures of the robot arm, and is not affected by a detection bias, a weight of the sensor, a weight of the end effecter, and a zero temperature drift. In this embodiment of this application, a shortage that the external acting force and the moment that are received by the robot arm in different postures cannot be directly provided in a related technology can be effectively overcome, and calibration of the sensor is divided into static calibration and dynamic calibration. Static calibration can effectively filter out a bias, a load weight, a weight, and the like of the sensor in different postures. Dynamic calibration can effectively filter out a zero drift of the sensor.

An expression of the external force and moment detected by the six-dimensional force sensor is shown in the following formula (1-1):

$$F_s = F_b + F_g + F_c + F_n + F_v + F_d + F_{non} \quad (1\text{-}1);$$

Herein, $F_s$ represents raw data of the force sensor, $F_b$ represents a biasing force of the force sensor, $F_g$ represents a force and a moment component that are caused by a gravity at a load end of the force sensor, $F_c$ represents an external acting force and a moment that are received by the force sensor, $F_n$ represents noise of the force sensor, $F_v$ represents an inertia force in a movement process of the force sensor, $F_d$ represents a zero drift of the force sensor, and $F_{non}$ represents another non-linear interference force of the force sensor.

The original data returned by the force sensor is $F_s$, and the original data is affected by many other force sources, so that an external acting force and a force moment value $F_c$ cannot be directly effective to the user. In addition, the robot arm motion considered in this application is a motion of the robot arm at a normal speed, and no obvious acceleration and deceleration are performed. Therefore, $F_v = 0$. In addition, in a general application, other non-linear interference of the force sensor is considered to be within a reasonable range, and $F_{non}$ is not considered. Therefore, the foregoing formula (1-1) may be converted into the following formula (1-2):

$$F_s = F_b + F_g + F_c + F_n + F_d \quad (1\text{-}2);$$

To enable the force sensor to directly provide external acting forces and moments in different postures, it is necessary to calibrate and describe interference items in the foregoing formula (1-2) one by one. $F_n$ and $F_d$ belong to a category of dynamic forces, and actual values of $F_b$ and $F_g$ may be acquired by means of static calibration. Therefore, $F_b$ and $F_g$ may be first calibrated.

In the calibration process of $F_b$ and $F_g$, the moment of the force of $F_b$ in the three-dimensional coordinate direction may be represented by using the following formula (1-3):

$$F_b [F_b^x, F_b^y, F_b^z, T_b^x, T_b^y, T_b^z]^T \quad (1\text{-}3);$$

Herein, $F_b$ is a constant bias of the force sensor, and $F_b^x$ is a component force of $F_b$ on the X-axis; $F_b^y$ is a component force of $F_b$ on the Y-axis; $F_b^z$ is a component force of $F_b$ on the Z-axis; $T_b^x$ is a moment of $F_b$ on the X-axis; $T_b^y$ is a moment of $F_b$ on the Y-axis; and $T_b^z$ is a moment of $F_b$ on the Z-axis. $F_b$ can be calibrated by using a value of the sensor in a specific direction.

Figure 14:
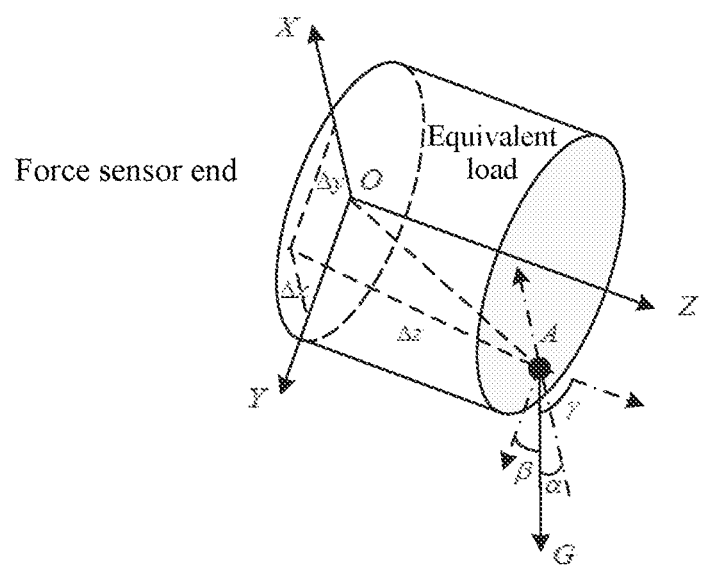
FIG. 14 is a schematic diagram of gravity decomposition performed on an equivalent load in a calibration process according to an embodiment of this application.

The measurement end of the six-dimensional force sensor is installed with a flange and an end execution tool. Generally, the measurement value of the six-dimensional force sensor is affected by a part weight of the six-dimensional force sensor. To some extent, each part cannot be effectively calibrated, because the flange, the end execution tool, and the weight of the six-dimensional force sensor can be considered as the same equivalent mass. Therefore, the entire end load that affects the effective acting force and moment measurement is considered as an equivalent load (including an equivalent gravity and an equivalent gravity moment). FIG. 14 is a schematic diagram of gravity decomposition performed on an equivalent load in a calibration process according to an embodiment of this application. As shown in FIG. 14, an equivalent load A (that is, a gravity G) may be decomposed into forces in three directions: an X-axis, a Y-axis, and a Z-axis, where an angle between the gravity G and the X-axis is α, an angle between the gravity G and the Y-axis is β, and an angle between the gravity G and the Z-axis is γ.

In an actual calibration process, $F_g = [F_g^x, F_g^y, F_g^z]$ may decompose the gravity G into three direction vectors by using a rotation matrix $R_e^0$ of an end effecter.

In the calibration process, an acting force and a moment $F_g = [F_g^x, F_g^y, F_g^z, T_g^x, T_g^y, T_g^z]$ that are applied due to the equivalent load may be represented by using the following formula (1-4):

$$\begin{cases} F_g^x = G_x = \left[(R_e^0)^T G\right]_x = G\cos\alpha \\ F_g^y = G_y = \left[(R_e^0)^T G\right]_y = G\cos\beta \\ F_g^z = G_z = \left[(R_e^0)^T G\right]_z = G\cos\gamma \\ T_g^x = F_g^z \Delta y - F_g^y \Delta z = G_z \Delta y - G_y \Delta z \\ T_g^y = F_g^x \Delta z - F_g^z \Delta x = G_x \Delta z - G_z \Delta x \\ T_g^z = F_g^y \Delta x - F_g^x \Delta y = G_y \Delta x - G_x \Delta y \end{cases} \quad (1\text{-}4);$$

Herein, $F_g^x$ and $G_x$ both represent component forces of the gravity G on the X-axis; $F_g^y$ and $G_y$ both represent component forces of the gravity G on the Y-axis; $F_g^z$ and $G_z$ both represent component forces of the gravity G on the Z-axis; $T_g^x$ represents a moment of the gravity G on the X-axis; $T_g^y$ represents a moment of the gravity G on the Y-axis; $T_g^z$ represents a moment of the gravity G on the Z-axis; $(R_e^0)^T$ represents transposition of the rotation matrix $R_e^0$; Δx represents a gravity moment in the X-axis direction; Δy represents a gravity moment in the Y-axis direction; and Δz represents a gravity moment in the Z-axis direction.

Based on the foregoing formula (1-4), for calibration of parameter $\psi = [F_b^x, F_b^y, F_b^z, T_b^x, T_b^y, T_b^z, \Delta x, \Delta y, \Delta z]^T$, a robot arm needs to provide n (n≥6) typical measurement positions for data reading and calibration, so that related data can be more accurately obtained. Therefore, there is a measurement process of the following formula (1-5):

$$\begin{cases} F_{sn}^x \approx F_b^x + G_{xn} \\ F_{sn}^y \approx F_b^y + G_{yn} \\ F_{sn}^z \approx F_b^z + G_{zn} \\ T_{sn}^x \approx T_b^x + G_{zn}\Delta y - G_{yn}\Delta z \\ T_{sn}^y \approx T_b^y + G_{xn}\Delta z - G_{zn}\Delta x \\ T_{sn}^z \approx T_b^z + G_{yn}\Delta x - G_{xn}\Delta y \end{cases} \Rightarrow \begin{bmatrix} F_{sn}^x \\ F_{sn}^y \\ F_{sn}^z \\ T_{sn}^x \\ T_{sn}^y \\ T_{sn}^z \end{bmatrix} - \begin{bmatrix} G_{xn} \\ G_{yn} \\ G_{zn} \\ 0 \\ 0 \\ 0 \end{bmatrix} \approx \quad (1\text{-}5)$$

-continued $$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & G_{zn} & -G_{yn} \\ 0 & 0 & 0 & 0 & 1 & 0 & -G_{zn} & 0 & G_{xn} \\ 0 & 0 & 0 & 0 & 0 & 1 & G_{yn} & -G_{xn} & 0 \end{bmatrix} \begin{bmatrix} F_b^x \\ F_b^y \\ F_b^z \\ T_b^x \\ T_b^y \\ T_b^z \\ \Delta x \\ \Delta y \\ \Delta z \end{bmatrix};$$

Herein, $F_{sn}^x$ represents a component force of an nth $F_s$ on the X-axis; $F_{xn}^y$ represents a component force of the nth $F_s$ on the Y-axis; $F_{sn}^z$ represents a component force of the nth $F_s$ on the Z-axis; $T_{sn}^x$ represents a component force of an nth $F_s$ on the X-axis; $T_{sn}^y$ represents a component force of the nth $F_s$ on the Y-axis; $T_{sn}^z$ represents a component force of the nth $F_s$ on the Z-axis; $G_{xn}$ represents a component force of an nth gravity G on the X-axis; $G_{yn}$ represents a component force of the nth gravity G on the Y-axis; and $G_{zn}$ represents a component force of the nth gravity G on the Z-axis.

A model of the foregoing formula (1-5) may be represented as a model of the following formula (1-6):

$$Z(n) \approx H^T(n)\psi \qquad (1\text{-}6);$$

Herein, Z(n) represents the output matrix, and Z(n) may be represented by using the following formula (1-7): $H^T(n)$ represents a measurement matrix, and $H^T(n)$ may be represented by using the following formula (1-8):

$$Z(n) = \begin{bmatrix} F_{sn}^x \\ F_{sn}^y \\ F_{sn}^z \\ T_{sn}^x \\ T_{sn}^y \\ T_{sn}^z \end{bmatrix} - \begin{bmatrix} G_{xn} \\ G_{yn} \\ G_{zn} \\ 0 \\ 0 \\ 0 \end{bmatrix}; \qquad (1\text{-}7)$$

$$H^T(n) = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & G_{zn} & -G_{yn} \\ 0 & 0 & 0 & 0 & 1 & 0 & -G_{zn} & 0 & G_{xn} \\ 0 & 0 & 0 & 0 & 0 & 1 & G_{yn} & -G_{xn} & 0 \end{bmatrix}. \qquad (1\text{-}8)$$

In this case, an error term E(n) between Z(n) and $H^T(n)$ may be introduced. In this case, there is the following formula (1-9):

$$Z(n) = H^T(n)\psi + E(n) \qquad (1\text{-}9);$$

Herein, Z(n) and $H^T(n)$ are both observable data, $\psi$ is a to-be-estimated parameter, and a criterion function J(n) of the following (1-10) may be obtained:

$$J(n) = \sum_{n=1}^{L}[E(n)]^2 = \sum_{n=1}^{L}(Z(n) - H^T(n)\psi)^2 = (Z_L - H_L\psi)^T(Z_L - H_L\psi); \qquad (1\text{-}10)$$

Herein, $Z_L$ is an output observation matrix, and $Z_L$ may be represented by using the following formula (1-11); $H_L$ is an input observation matrix, and $H_L$ may be represented by using the following formula (1-12).

$$Z_L = =[Z(1)Z(2)\ldots Z(n)]^T \qquad (1\text{-}11);$$

$$H_L = [H(1)^T H(2)^T \ldots H(n)^T]^T \qquad (1\text{-}12).$$

After the criterion function J(n) is obtained, an estimated value of the parameter $\psi$ may be solved by minimizing J(n) by using a least square method.

Herein, it may be assumed that the parameter $\hat{r}_{LS}$ makes $J(n)|_{\hat{r}_{LS}}$=min, and the following formula (1-13) exists;

$$\frac{\partial J(n)}{\partial \psi}\Big|_{\hat{r}_{LS}} = \frac{\partial}{\partial \psi}(Z_L - H_L\psi)^T(Z_L - H_L\psi) = 0; \qquad (1\text{-}13)$$

Therefore, the following regular equation (1-14) is obtained:

$$(H_L^T H_L)\hat{r}_{LS} = H_L^T Z_L \qquad (1\text{-}14);$$

When $H_L^T H_L$ is a regular matrix, there is an estimated value of the following formula (1-15):

$$\hat{r}_{LS} = (H_L^T H_L)^{-1} H_L^T Z_L \qquad (1\text{-}15).$$

The parameter estimated value $\hat{r}_{LS}$ obtained by using the foregoing formula (1-15) ensures the minimum value of J(n), that is, J(n)=min, and J(n) is unique.

After calibration is performed by using the foregoing process, theoretically, a reading $(F_s)_{cal}$ of the moment sensor is shown in the following formula (1-16):

$$(F_s)_{cal} = F_c + (F_d)_k \qquad (1\text{-}16);$$

Herein, $(F_s)_{cal}$ represents the reading of the force sensor; and $(F_d)_k$ represents a zero drift value at moment k.

The foregoing process is a calibration process of $F_b$ and $F_g$. In addition, after calibration of $F_b$ and $F_g$ is completed, another force needs to be calibrated.

In this embodiment of this application, for calibration of $F_n$, instability of a force and a moment value that are caused by noise may be processed in a mean filtering manner. An interference force $F_d$ caused by a zero drift can be removed according to actual conditions after other options are calibrated.

For example, for calibration of $F_d$, several other fixed forces (for example, $F_b$ and $F_g$) may be calibrated first in a relatively short time. After calibration, the zero drift is not present by default in the calibration process. Then, if the sensor detects a zero drift after calibrating the other fixed forces, for example, in a case that the sensor is static after calibration, a theoretical output is to be 0, but an actual output is 10, the output 10 is a zero drift value, and the zero drift value is subtracted.

Figure 15:
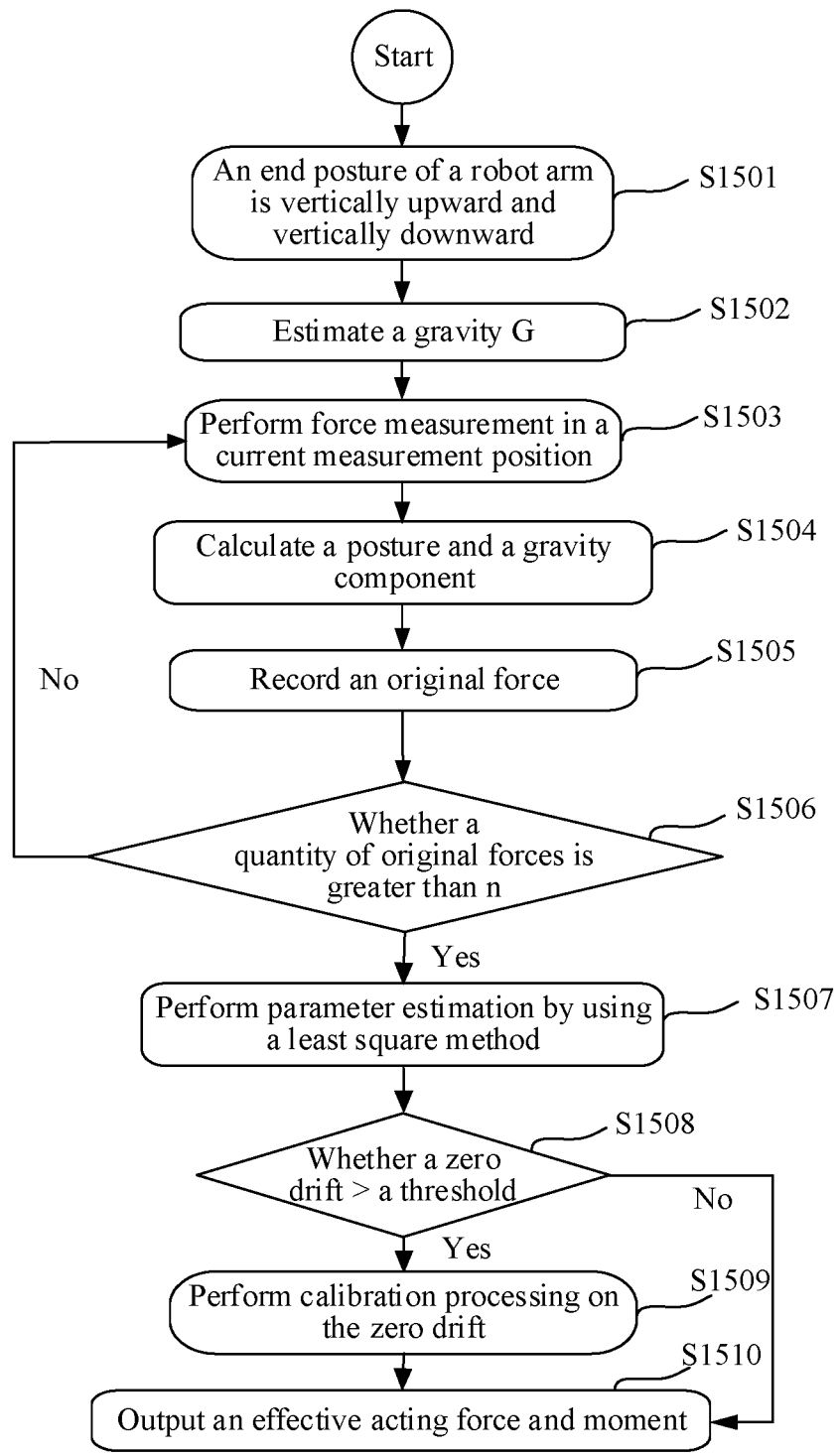
FIG. 15 is a schematic diagram of an implementation process of a calibration method for a six-dimensional force sensor according to an embodiment of this application.

FIG. 15 is a schematic diagram of an implementation process of a calibration method for a six-dimensional force sensor according to an embodiment of this application. As shown in FIG. 15, the calibration method includes the following steps:

Step S1501: A posture of a six-dimensional force sensor at an end of a robot arm is vertically upward and vertically downward.

Herein, data measurement may be separately performed on a Z-axis of the force sensor vertically upward and vertically downward to measure a gravity G.

Step S1502: Estimate the gravity G.

Herein, the force sensor carried by the robot arm is vertically upward and vertically downward along the Z-axis, and readings are respectively $(F_s^z)_{up}$ and $(F_s^z)_{down}$, where $(F_s^z)_{up}$ represents measurement data when the force sensor is vertically upward along the Z-axis, and may be represented by using the following formula (1-17): $(F_s^z)_{down}$ represents measurement data when the force sensor is vertically downward along the Z-axis, and may be represented by using the following formula (1-18):

$$(F_s^z)_{up} = F_b^z + G \quad (1\text{-}17);$$

$$(F_s^z)_{down} = F_b^z - G \quad (1\text{-}18).$$

Therefore, an equivalent gravity G may be calculated by using the following formula (1-19):

$$G = \text{abs}((F_s^z)_{up} - (F_s^z)_{down})/2 \quad (1\text{-}19);$$

Herein, abs represents an absolute value function.

Step S1503: Perform force measurement in a current measurement position.

Step S1504: Calculate a posture and a gravity component of the sensor.

Step S1505: Record a calculated original force.

Step S1503 to step S1505 are corresponding to processes of acquiring and calculating original forces $F_b$ and $F_g$ in the foregoing formulas (1-3) and (1-4), and details are not described in this embodiment of this application.

Step S1506: Determine whether a quantity of currently recorded original forces is greater than a preset quantity of measurement times n. If a determining result is yes, perform step S1507. If the determining result is no, modify a measurement position and return to continue to perform step S1503. In this embodiment of this application, a value of n may be n≥6.

Step S1507: Perform parameter estimation by using a least square method according to the recorded n original forces.

Step S1507 is corresponding to a process of parameter estimation in the foregoing formulas (1-5) to (1-15).

In this embodiment of this application, $F_b$ and $F_g$ are calibrated by using the least square method. After the calibration, the degree of the moment sensor is represented by using the foregoing formula (1-16) as: $(F_s)_{cal} = F_c + (F_d)_k$.

Step S1508: Determine whether a detected zero drift is greater than a threshold.

If a determining result is yes, perform step S1509. If the determining result is no, perform step S1510.

Step S1509: Perform calibration processing on the zero drift.

Herein, for a temperature zero drift value $(F_d)_k$ at moment k, zero drift processing of the force sensor may be implemented by using the following formula (1-20):

$$(F_s)_{final} = (F_s)_{cal} - (F_d)_k \quad (1\text{-}20);$$

Herein, $(F_s)_{final}$ represents an effective acting force and moment that are obtained after zero drift processing is performed.

Step S1510: Output the effective acting force and moment.

According to the calibration method for a six-dimensional force sensor at an end of a robot arm provided in this embodiment of this application, after the six-dimensional force sensor at the end is calibrated, an external acting force and an acting moment that are on a load end of the six-dimensional force sensor may be directly given to a user, so that the robot arm can implement impedance control in a full-posture direction in an entire workspace, and in a teleoperation application based on force feedback, a control end can effectively perform gravity sensing.

The following continues to describe an example structure in which a data measurement apparatus 354 provided in the embodiments of this application is implemented as a software module. In some embodiments, as shown in FIG. 2, a software module stored in the data measurement apparatus 354 of the memory 350 may be a data measurement apparatus in the server 300, including:

a first acquiring module 3541, configured to acquire a gravity of a sensor itself and a static force measured in response to the sensor being in a static state and having no external acting force;

an equivalent calibration processing module 3542, configured to perform equivalent calibration processing on the gravity and the static force to obtain a calibrated static force;

a second acquiring module 3543, configured to acquire a dynamic force measured in response to the sensor being in a motion state and having no external acting force;

a zero drift processing module 3544, configured to perform zero drift processing on the dynamic force according to the calibrated static force to obtain a calibrated dynamic force; and a processing module 3545, configured to use the calibrated dynamic force as a calibration parameter for performing calibration in response to the sensor measuring an external acting force, to obtain a calibrated sensor with the calibration parameter.

In some embodiments, the static force includes a gravity component caused by the gravity of the sensor itself and a biasing force of the sensor; and the equivalent calibration processing module is configured to: perform zeroing calibration processing on the biasing force of the sensor, and perform the equivalent calibration processing on the gravity and the gravity component to obtain the calibrated static force.

In some embodiments, in event that the sensor is in the static state, the sensor includes a first position posture in a three-dimensional coordinate system and a second position posture in the three-dimensional coordinate system; and correspondingly, the first acquiring module is configured to acquire a first static force of the sensor in the first position posture and a second static force of the sensor in the second position posture; and determine an average value of the first static force and the second static force as the static force.

In some embodiments, the apparatus further includes a determining module, configured to determine a preset quantity of positions that are different from each other; a third acquiring module, configured to separately acquire, in the preset quantity of positions, static forces measured in response to the sensor being in the static state and having no external acting force; and correspondingly, the equivalent calibration processing module is configured to perform equivalent calibration processing on the gravity and the preset quantity of static forces to obtain the calibrated static force.

In some embodiments, the equivalent calibration processing module is configured to perform data conversion processing on the gravity and the preset quantity of static forces to obtain a criterion function; and perform minimization processing on the criterion function by using a least square method, to obtain the calibrated static force.

In some embodiments, the equivalent calibration processing module is configured to: determine, according to the gravity and the preset quantity of static forces, an output matrix corresponding to each static force in at least three dimensions; perform force decomposition processing on the output matrix to obtain a measurement matrix and a to-be-estimated parameter that are obtained after decomposition and corresponding to the static force; and determine the criterion function according to the output matrix, the measurement matrix, and the to-be-estimated parameter that are corresponding to each static force in the preset quantity of static forces.

In some embodiments, the equivalent calibration processing module is configured to perform minimization processing on the criterion function by using the least square method, to obtain an estimated value corresponding to the to-be-estimated parameter; and determine the estimated value as the calibrated static force.

In some embodiments, the dynamic force includes a zero drift value of the sensor; and correspondingly, the zero drift processing module is configured to: determine a difference between the calibrated static force and the zero drift value of the sensor; and determine the difference as the calibrated dynamic force.

In some embodiments, the dynamic force includes a force caused by noise interference; and the apparatus further includes a removing module, configured to remove, in a mean filtering manner, the force caused by the noise interference.

In some embodiments, the sensor includes a six-dimensional force sensor; the static force includes three static force components in a three-dimensional coordinate direction and three static moment components in the three-dimensional coordinate direction; and the dynamic force includes three dynamic force components in the three-dimensional coordinate direction and three dynamic moment components in the three-dimensional coordinate direction.

The description of the apparatus embodiments of this application is similar to the description of the above method embodiments, and has similar beneficial effects as the method embodiments, and details are not described herein again. For details not disclosed in the apparatus embodiments of this application, refer to the method embodiments of this application for understanding.

An embodiment of this application provides a storage medium storing an executable instruction, the executable instruction set being executed by a processor to cause the processor to implement the method provided in this application, such as the method shown in FIG. 3.

In some embodiments, the storage medium may be a memory such as a ferromagnetic random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM). The storage medium may also be a variety of devices including one or any combination of the above memories.

In some embodiments, the executable instruction may adopt the form of programs, software, software modules, scripts or codes, be written in any form of programming language (including compiled or interpreted languages, or declarative or procedural languages), and be deployed in any form, including being deployed as an independent program or as a module, component, subroutine or other unit suitable for being uses in a computing environment.

The term module (and other similar terms such as unit, submodule, etc.) in this disclosure may refer to a hardware module, or a combination of a hardware module and a software module. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

As an example, the executable instruction may but do not necessarily correspond to files in the file system, and may be stored as part of the file that saves other programs or data, for example, the executable instruction is stored in one or more scripts of a hyper text markup language (HTML) document, in a single file dedicated to the program discussed, or in multiple coordinated files (for example, a file storing one or more modules, subprograms, or code parts). As an example, the executable instruction may be deployed to be executed on one computing device, or on a plurality of computing devices located in one location, or on a plurality of computing devices that are distributed in a plurality of locations and interconnected by a communication network.

The foregoing descriptions are merely embodiments of this application, but are not intended to limit this application. A person skilled in the art may make various modifications and changes to this application. Any modification, equivalent replacement, or improvement made without departing from the spirit and range of this application shall fall within the protection scope of this application.

INDUSTRIAL APPLICABILITY

In the embodiments of this application, when a sensor needs to be calibrated, equivalent calibration processing may be performed on a gravity of the sensor and a static force measured in response to the sensor being in a static state and having no external acting force to obtain a calibrated static force. Zero drift processing is performed, according to the calibrated static force, on a dynamic force measured in response to the sensor being in a motion state and having no external acting force, to obtain a calibrated dynamic force. The calibrated dynamic force is used as a calibration parameter for performing calibration in response to the sensor measuring the external acting force, so as to obtain a calibrated sensor, and calibration processing is implemented for the sensor in different postures, so that accurate calibration can be performed on the sensor, which has great industrial applicability.

What is claimed is:

1. A sensor calibration method, performed by an electronic device and comprising:
    acquiring a gravity of a sensor and a static force measured in response to the sensor being in a static state and having no external acting force;
    performing equivalent calibration processing on the gravity and the static force to obtain a calibrated static force;
    acquiring a dynamic force measured in response to the sensor being in a motion state and having no external acting force;
    performing zero drift processing on the dynamic force according to the calibrated static force to obtain a calibrated dynamic force; and
    using the calibrated dynamic force as a calibration parameter to perform calibration in response to the sensor measuring an external acting force, to obtain a calibrated sensor with the calibration parameter.

2. The method according to claim 1, wherein the static force comprises a gravity component caused by the gravity of the sensor and a biasing force of the sensor; and the performing equivalent calibration processing on the gravity and the static force to obtain a calibrated static force comprises:
    performing zeroing calibration processing on the biasing force of the sensor, and performing the equivalent calibration processing on the gravity and the gravity component to obtain the calibrated static force.

3. The method according to claim 1, wherein in response to the sensor being in the static state, the sensor comprises a first position posture in a three-dimensional coordinate system and a second position posture in the three-dimensional coordinate system; and
    the acquiring a static force measured in response to the sensor being in a static state and having no external acting force comprises:
    acquiring a first static force of the sensor in the first position posture and a second static force of the sensor in the second position posture.

4. The method according to claim 3, further comprising:
    determining an average value of the first static force and the second static force as the static force.

5. The method according to claim 1, wherein the method further comprises:
    determining a preset quantity of positions that are different from each other;
    separately acquiring, in the preset quantity of positions, static forces measured in response to the sensor being in the static state and having no external acting force; and
    performing equivalent calibration processing on the gravity and the preset quantity of static forces to obtain the calibrated static force.

6. The method according to claim 5, wherein the performing equivalent calibration processing on the gravity and the preset quantity of static forces to obtain the calibrated static force comprises:
    performing data conversion processing on the gravity and the preset quantity of static forces to obtain a criterion function; and
    performing minimization processing on the criterion function by using a least square method, to obtain the calibrated static force.

7. The method according to claim 6, wherein the performing data conversion processing on the gravity and the preset quantity of static forces to obtain a criterion function comprises:
    determining, according to the gravity and the preset quantity of static forces, an output matrix corresponding to each static force in at least three dimensions;
    performing force decomposition processing on the output matrix to obtain a measurement matrix and a to-be-estimated parameter that are obtained after decomposition and corresponding to the static force; and
    determining the criterion function according to the output matrix, the measurement matrix, and the to-be-estimated parameter that are corresponding to each static force in the preset quantity of static forces.

8. The method according to claim 7, wherein the performing minimization processing on the criterion function by using a least square method, to obtain the calibrated static force comprises:
    performing minimization processing on the criterion function by using the least square method, to obtain an estimated value corresponding to the to-be-estimated parameter; and
    determining the estimated value as the calibrated static force.

9. The method according to claim 1, wherein the dynamic force comprises a zero drift value of the sensor; and the performing zero drift processing on the dynamic force according to the calibrated static force to obtain a calibrated dynamic force comprises:
    determining a difference between the calibrated static force and the zero drift value of the sensor; and
    determining the difference as the calibrated dynamic force.

10. The method according to claim 1, wherein the dynamic force comprises a force caused by noise interference; and the method further comprises:
    removing, in a mean filtering manner, the force caused by the noise interference.

11. The method according to claim 1, wherein the sensor comprises a six-dimensional force sensor;
    the static force comprises three static force components in a three-dimensional coordinate direction and three static moment components in the three-dimensional coordinate direction; and
    the dynamic force comprises three dynamic force components in the three-dimensional coordinate direction and three dynamic moment components in the three-dimensional coordinate direction.

12. A sensor calibration apparatus, comprising:
    a memory storing a plurality of instructions; and
    a processor configured to execute the plurality of instructions, and upon execution of the plurality of instructions, the processor is configured to:
    acquire a gravity of a sensor and a static force measured in response to the sensor being in a static state and having no external acting force;
    perform equivalent calibration processing on the gravity and the static force to obtain a calibrated static force;
    acquire a dynamic force measured in response to the sensor being in a motion state and having no external acting force;
    perform zero drift processing on the dynamic force according to the calibrated static force to obtain a calibrated dynamic force; and
    use the calibrated dynamic force as a calibration parameter to perform calibration in response to the sensor measuring an external acting force, to obtain a calibrated sensor with the calibration parameter.

13. The apparatus according to claim 12, wherein the static force comprises a gravity component caused by the gravity of the sensor and a biasing force of the sensor, wherein the processor, in order to perform equivalent calibration processing on the gravity and the static force to obtain a calibrated static force, is configured to execute the plurality of instructions to:
    perform zeroing calibration processing on the biasing force of the sensor, and
    perform the equivalent calibration processing on the gravity and the gravity component to obtain the calibrated static force.

14. The apparatus according to claim 12, wherein in response to the sensor being in the static state, the sensor comprises a first position posture in a three-dimensional coordinate system and a second position posture in the three-dimensional coordinate system, and wherein the processor, in order to acquire a static force measured in response to the sensor being in a static state and having no external acting force, is configured to execute the plurality of instructions to:
    acquire a first static force of the sensor in the first position posture and a second static force of the sensor in the second position posture; and
    determine an average value of the first static force and the second static force as the static force.

15. The apparatus according to claim 12, wherein the processor, upon execution of the plurality of instructions, is further configured to:

determine a preset quantity of positions that are different from each other;

separately acquire, in the preset quantity of positions, static forces measured in response to the sensor being in the static state and having no external acting force; and perform equivalent calibration processing on the gravity and the preset quantity of static forces to obtain the calibrated static force.

16. The apparatus according to claim 15, wherein the processor, in order to perform equivalent calibration processing on the gravity and the preset quantity of static forces to obtain the calibrated static force, is configured to execute the plurality of instructions to:

perform data conversion processing on the gravity and the preset quantity of static forces to obtain a criterion function; and perform minimization processing on the criterion function by using a least square method, to obtain the calibrated static force.

17. A non-transitory computer readable storage medium storing a plurality of instructions executable by a processor, wherein the plurality of instructions, when executed by the processor, is configured to cause the processor to:

acquire a gravity of a sensor and a static force measured in response to the sensor being in a static state and having no external acting force;

perform equivalent calibration processing on the gravity and the static force to obtain a calibrated static force;

acquire a dynamic force measured in response to the sensor being in a motion state and having no external acting force;

perform zero drift processing on the dynamic force according to the calibrated static force to obtain a calibrated dynamic force; and use the calibrated dynamic force as a calibration parameter to perform calibration in response to the sensor measuring an external acting force, to obtain a calibrated sensor with the calibration parameter.

18. The non-transitory computer readable storage medium according to claim 17, wherein the static force comprises a gravity component caused by the gravity of the sensor and a biasing force of the sensor, wherein the plurality of instructions, in order to cause the processor to perform equivalent calibration processing on the gravity and the static force to obtain a calibrated static force, is configured to cause the processor to:

perform zeroing calibration processing on the biasing force of the sensor, and perform the equivalent calibration processing on the gravity and the gravity component to obtain the calibrated static force.

19. The non-transitory computer readable storage medium according to claim 17, wherein in response to the sensor being in the static state, the sensor comprises a first position posture in a three-dimensional coordinate system and a second position posture in the three-dimensional coordinate system, and wherein the plurality of instructions, in order to cause the processor to acquire a static force measured in response to the sensor being in a static state and having no external acting force, is configured to cause the processor to:

acquire a first static force of the sensor in the first position posture and a second static force of the sensor in the second position posture; and determine an average value of the first static force and the second static force as the static force.

20. The non-transitory computer readable storage medium according to claim 17, wherein the plurality of instructions, when executed by the processor, is further configured to cause the processor to:

determine a preset quantity of positions that are different from each other;

separately acquire, in the preset quantity of positions, static forces measured in response to the sensor being in the static state and having no external acting force; and perform equivalent calibration processing on the gravity and the preset quantity of static forces to obtain the calibrated static force.

* * * * *